US007007639B1

(12) United States Patent
Luttgeharm

(10) Patent No.: US 7,007,639 B1
(45) Date of Patent: Mar. 7, 2006

(54) AIR INJECTION ENGINE

(75) Inventor: Clint Allen Luttgeharm, Wichita, KS (US)

(73) Assignee: D-J Engineering, Inc., Augusta, KS (US)

( * ) Notice: Subject to any disclaimer, the term of this patent is extended or adjusted under 35 U.S.C. 154(b) by 0 days.

(21) Appl. No.: 10/777,796

(22) Filed: Feb. 12, 2004

Related U.S. Application Data

(60) Provisional application No. 60/446,934, filed on Feb. 12, 2003.

(51) Int. Cl.
*F02B 33/00* (2006.01)
*F01L 7/00* (2006.01)
*F16K 11/07* (2006.01)

(52) U.S. Cl. .................. 123/68; 123/80 R; 123/190.1; 137/625.29

(58) Field of Classification Search .................. 123/68, 123/81 R, 81 B, 190.1, 190.4, 190.6, 80 R, 123/70 R; 60/627; 137/624.11, 625.11, 137/625.29
See application file for complete search history.

(56) References Cited

U.S. PATENT DOCUMENTS

| | | | |
|---|---|---|---|
| 611,125 A | 9/1898 | Humphrey | |
| 1,062,999 A | 5/1913 | Webb | |
| 3,555,814 A | 1/1971 | Morsell, III | |
| 3,775,973 A | 12/1973 | Hudson | |
| 4,010,613 A | 3/1977 | McInerney | 60/599 |
| 4,016,839 A | 4/1977 | Morton | 123/65 BA |
| 4,036,184 A * | 7/1977 | Guenther | 123/190.1 |
| 4,040,400 A * | 8/1977 | Kiener | 123/68 |
| 4,133,172 A | 1/1979 | Cataldo | |
| 4,137,705 A | 2/1979 | Anderson et al. | |
| 4,182,492 A | 1/1980 | Albert et al. | |
| 4,215,659 A | 8/1980 | Lowther | 123/68 |
| 4,333,424 A * | 6/1982 | McFee | 123/68 |
| 4,506,634 A * | 3/1985 | Kerrebrock | 123/68 |
| 4,553,385 A | 11/1985 | Lamont | |
| 4,592,309 A * | 6/1986 | Williams | 123/68 |
| 4,608,827 A | 9/1986 | Hasegawa et al. | |
| 4,653,269 A * | 3/1987 | Johnson | 60/627 |
| 4,696,158 A | 9/1987 | DeFrancisco | |
| 4,776,306 A * | 10/1988 | Matsuura et al. | 123/80 R |
| 4,989,641 A | 2/1991 | Jones et al. | 137/625.11 |
| 5,012,646 A | 5/1991 | Speer | |
| 5,244,013 A * | 9/1993 | Gagas | 137/625.29 |
| 5,490,485 A * | 2/1996 | Kutlucinar | 123/190.4 |
| 5,711,265 A | 1/1998 | Duve | 123/190.1 |

(Continued)

OTHER PUBLICATIONS

PCT International Search Report for PCT/US04/04547, 7 pages, attached.

*Primary Examiner*—Thai-Ba Trieu

(57) ABSTRACT

An internal combustion engine of the present invention features separate compression and expansion cycles. The engine includes a separate compressor device which pressurizes air by a ratio greater than 15 to 1, at least one two stroke combustion cylinder and a compressed air conduit for transferring compressed air from the compressor to the at least one combustion cylinder. An air injection valve injects the compressed air into the combustion cylinder during the second half portion of the return stroke of the combustion cylinder. The compressed air is mixed with fuel and combusted for expansion during a power stroke. In this engine compression occurs only to a minor degree in the combustion cylinder. Accordingly, the compression ratio of the present engine may be significantly higher or lower than the volumetric expansion ratio of the combustion cylinder thus resulting in corresponding increases in either power density or thermodynamic efficiency respectively.

14 Claims, 28 Drawing Sheets

U.S. PATENT DOCUMENTS

| | | |
|---|---|---|
| 5,785,015 A * | 7/1998 | Philippe et al. ............ 123/70 R |
| 5,857,436 A | 1/1999 | Chen ............................ 123/68 |
| 6,009,859 A | 1/2000 | Roche et al. |
| 6,158,399 A | 12/2000 | Ash et al. |
| 6,199,369 B1 | 3/2001 | Meyer |
| 6,293,242 B1 * | 9/2001 | Kutlucinar ................ 123/190.6 |
| 6,308,677 B1 * | 10/2001 | Bohach et al. ............ 123/190.1 |
| 6,510,690 B1 | 1/2003 | Furukawa et al. |
| 2001/0054412 A1 | 12/2001 | Kojima |

* cited by examiner

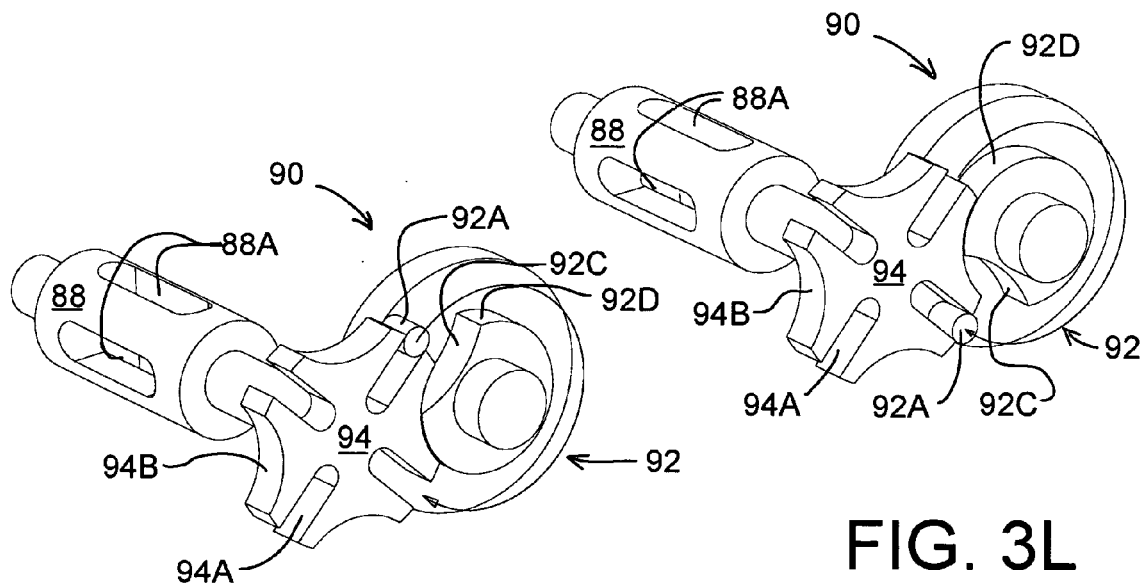
FIG. 3K
FIG. 3L
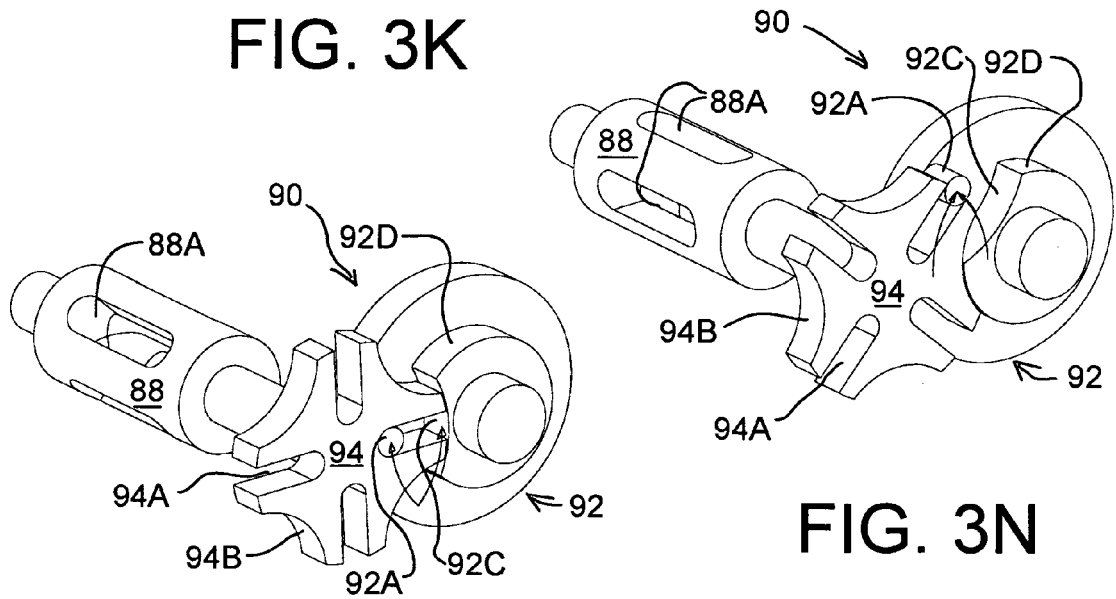
FIG. 3M
FIG. 3N

AIR INJECTION ENGINE

This application claims the benefit of U.S. Provisional Patent Application No. 60/446,934 filed 12 Feb. 2003.

FIELD OF THE INVENTION

The present invention relates to an internal combustion engine.

BACKGROUND OF THE INVENTION

Many types of internal combustion engines are known in the art. It is well known that increasing the compression ratio of an internal combustion engine will result in increased thermodynamic efficiency. With many prior art engines, the compression ratio of the engine is limited by the expansion ratio of the cylinders of the engine. In other prior art engines, the compression ratio of the engine is limited to a relatively low value because auto-ignition of the fuel air mixture will occur too early in the cycle as compressed air reaches a temperature above the auto-ignition temperature of the fuel.

BRIEF DESCRIPTION OF THE INVENTION

In an embodiment of the present invention the aforementioned problems are addressed by providing an internal combustion engine in which the compression and expansion portions of the engine's cycle and the compression and expansion ratios are independent. The present engine includes a compressor which pressurizes air by a ratio which may be substantially more than 15 to 1, a combustion cylinder including a reciprocating piston which oscillates between a top dead center position and a bottom dead center position in a power stroke and between the bottom dead center position and the top dead center position in a return stroke and a compressed air conduit for transferring compressed air from the compressor to the combustion cylinder. Pneumatic communication between the compressed air conduit and the combustion cylinder is governed by a timed valve which intermittently opens to release pressurized air into the combustion cylinder when the piston is in the second half portion of the return stroke. A fuel injector is employed to mix fuel with the pressurized air to make a fuel—air mixture which is combusted to produce hot, high pressure gaseous combustion products which expand during the power stroke. In this present engine, because the compression of air for use in the combustion portion of the cycle is conducted separately and then injected or released into the combustion cylinder when it is needed, the ratio of compression can be significantly higher or lower than the ratio of expansion. A higher expansion ratio results in a significant increase in thermodynamic efficiency while a higher compression ratio results in a significant increase in power density. Moreover, since the present engine conducts compression and expansion separately, compressed air for use in the combustion cylinder may be cooled to prevent early ignition of a fuel air mixture thus permitting a higher compression ratio.

The injection of pressurized air from the compressed air conduit into the combustion cylinder preferably occurs during a relatively small portion of the combustion cylinder cycle preferably when the piston is in the second half of the return stroke. Accordingly, a timed valve such as an indexed rotary valve which presents a relatively large flow area may be used to provide timed intermittent pneumatic communication between the compressed air conduit and the combustion cylinder. Such a valve arrangement should therefore provide timed, intermittent pneumatic communication between the compressed air conduit and the combustion cylinder sufficient to allow air pressure in the compressed air conduit and the combustion chamber to substantially equalize during a relatively small portion of the combustion cylinder cycle when the piston of the combustion cylinder is in the second half of the return stroke.

BRIEF DESCRIPTION OF THE DRAWINGS

FIG. 3K is an isometric view of the indexed rotary valve with the valve housing removed for clarity as the valve body comes to rest at the end of a 90 degree rotation.

FIG. 3L is an isometric view of the indexed rotary valve with the valve housing removed for clarity as the valve body begins a next 90 rotation.

FIG. 3M is an isometric view of the indexed rotary valve with the valve housing removed for clarity as the valve body is rotating at a high speed.

FIG. 3N is an isometric view of the indexed rotary valve with the valve housing removed for clarity as the valve body comes to rest at the end of a 90 degree rotation.

DETAILED DESCRIPTION

Figure 1:
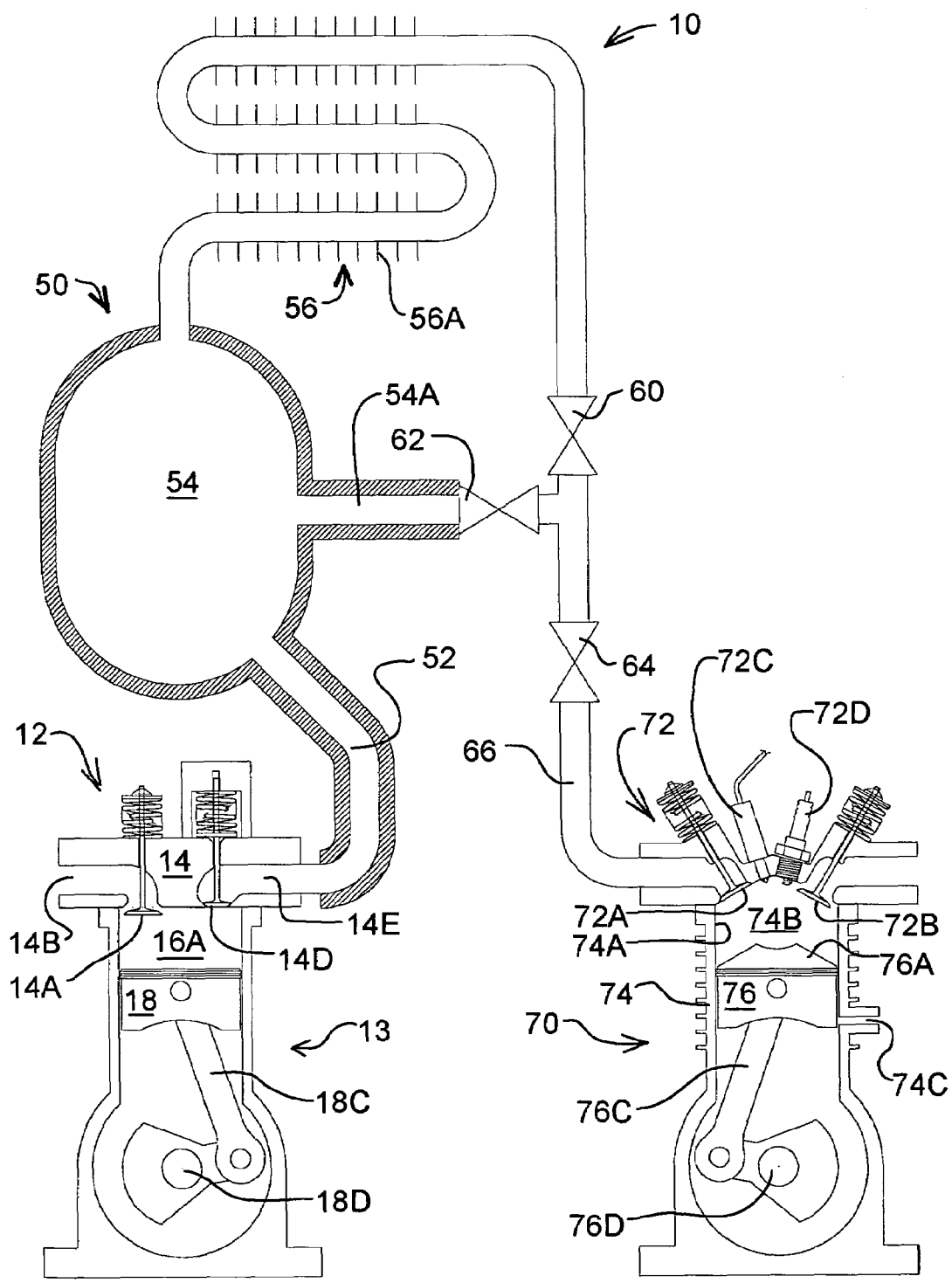
FIG. 1 is a diagram of the internal combustion engine of the present invention.

Referring to the drawings, FIG. 1 illustrates an internal combustion engine 10 in accordance with an embodiment of the invention. In FIG. 1, an-internal combustion engine 10 is shown including compressor 12, compressed air conduit 50 and combustion cylinder 70. Combustion cylinder 70 includes a cylinder 74 and a reciprocating piston 76 which is one of the mechanical arrangements for defining an internal combustion engine which features a combustion chamber that cycles between a minimum volume and a maximum volume. Combustion cylinder 70 may be one of two or more combustion cylinders coupled together on a common crankshaft 76D. Likewise compressor 12 may include a compression cylinder 13 as shown in FIG. 1. Compressor 12 provides compressed air to compressed air conduit 50. Together, compressor 12 and compressed air conduit 50 provide a source of compressed air for use by combustion cylinder 70.

Figure 1A:
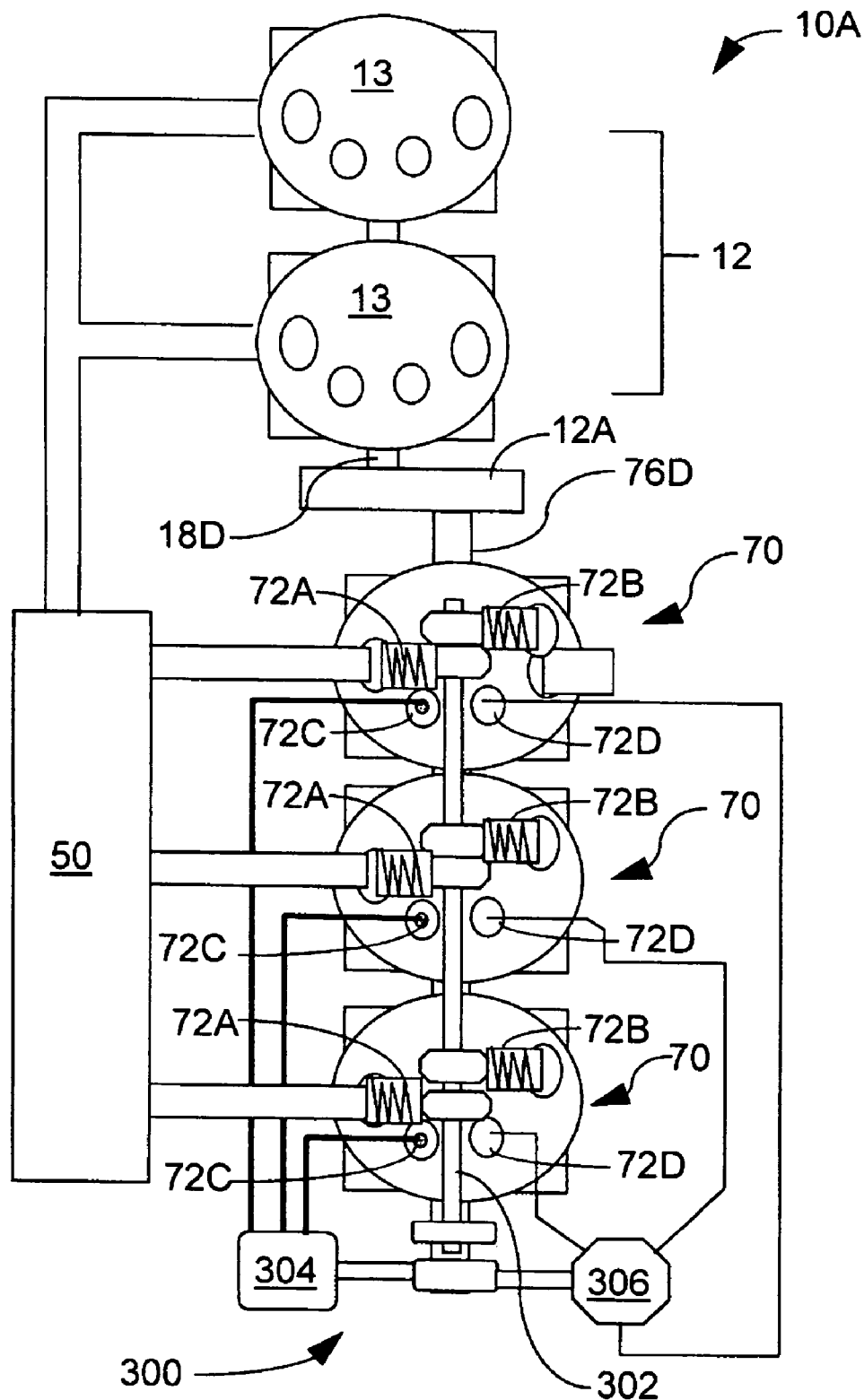
FIG. 1A is a diagram of an embodiment of the internal combustion engine of the present invention having three combustion cylinders and two compression cylinders.

FIG. 1A schematically presents an example embodiment of the present engine 10A having three combustion cylinders 70 associated on common crankshaft 76D and a compressor 12 comprising two compression cylinders 13 associated on a common compressor crankshaft 18D. In FIG. 1A, crankshaft 76D and compressor crankshaft 18D are coupled by a variable ratio gear box 12A. This variable ratio gear box may be adjusted to adjust the volume of compressed air delivered to compressed air conduit 50. The advantage of having a the capability to control the delivery of the compressed air within conduit 50 are described in detail below but generally allow an adjustment in operating conditions between a mode having a relatively low volumetric compression ratio and a relatively high expansion ratio for maximum thermodynamic efficiency and a mode of relatively high volumetric compression ratio and a relatively low expansion ratio for maximum power density. The combustion cylinders 70 of example engine 10A each include injection-valves 72A, exhaust valves 72B, fuel injectors 72C and ignition initiators 72D. FIG. 1A also illustrates a timing system 300 for timing the operations of injection valves 72A, exhaust valves 72B, fuel injectors 72C and combustion ignition initiators 72D. Such a timing system is needed for the operation of an internal combustion engine but is omitted from many of the other figures for clarity. Timing system 300, in this example, includes a cam shaft 302, a fuel injection timer 304 and an ignition timer 306. Cam shaft 302 is mechanically coupled to crankshaft 76D and carries a series of eccentric cams for governing the operations of injection valves 72A and exhaust valves 72B. Fuel injection timer 304 governs the operations of fuel injectors 72C, while ignition timer 306 governs the operations of ignition initiators 72D. Both fuel injection timer 304 and ignition timer 306 are coupled to crankshaft 76D. Timing system 300 as presented here is only one of many possible timing systems and the selection here of particular types of components is not intended to limit the scope of the invention. FIG. 1A also illustrates that combustion cylinder 70 may be one of a plurality combustion cylinders coupled by a common crankshaft. FIG. 1A is not intended to suggest that compressor 12 must be a cylinder—piston type compressor or that compressor 12 would be limited to having two compression cylinders.

Compressor 12 takes in air from the outside environment and delivers compressed air to compressed air conduit 50. In the embodiment shown in FIG. 1, compressor 12 is a compression cylinder 13 which further includes a compression cylinder head 14, a compression cylinder body 16 and a compression piston 18. The upper surface of compression piston 18, the inside wall of compression cylinder body 16 and compression cylinder head 14 define compression chamber 16A which constantly changes in volume as compression piston reciprocates with compression cylinder 13. Compression piston 18 is connected by a connecting rod 18C to a compression crankshaft 18D. Compression cylinder head 14 includes an intake valve 14A and an outlet valve 14D. Intake valve 14A governs pneumatic communication between an intake port 14B leading to the outside environment and compression chamber 16A. Outlet valve 14D governs pneumatic communication between compression chamber 16A and an outlet port 14E which leads to compressed air conduit 50.

Compressed air conduit 50 retains compressed air produced by compressor 12 and conveys compressed air to combustion cylinder 70. In the embodiment shown in FIG. 1, compressed air conduit 50 generally includes a storage means and a cooling means so that a supply of temperature conditioned pressurized air may be available for use by combustion cylinder 70. In the embodiment shown in FIG. 1, compressed air conduit 50 further includes an intake portion 52, an insulated reservoir 54, a heat rejecting portion 56 having heat rejecting fins 56A, a cool compressed air valve 60, an insulated hot air conduit 54A, hot compressed air valve 62, a pressure regulator 64 and an outlet portion 66. Cool compressed air valve 60 and hot compressed air valve 62 can be adjusted in order to adjust the temperature of air in outlet portion 66 as will be described in more detail below. Pressure regulator 64 is for regulating the pressure of the pressurized air in outlet portion 66. Preferably, reservoir 54 should encompass a volume sufficient to provide a steady supply of compressed air for use by combustion cylinder 70.

Figure 3:
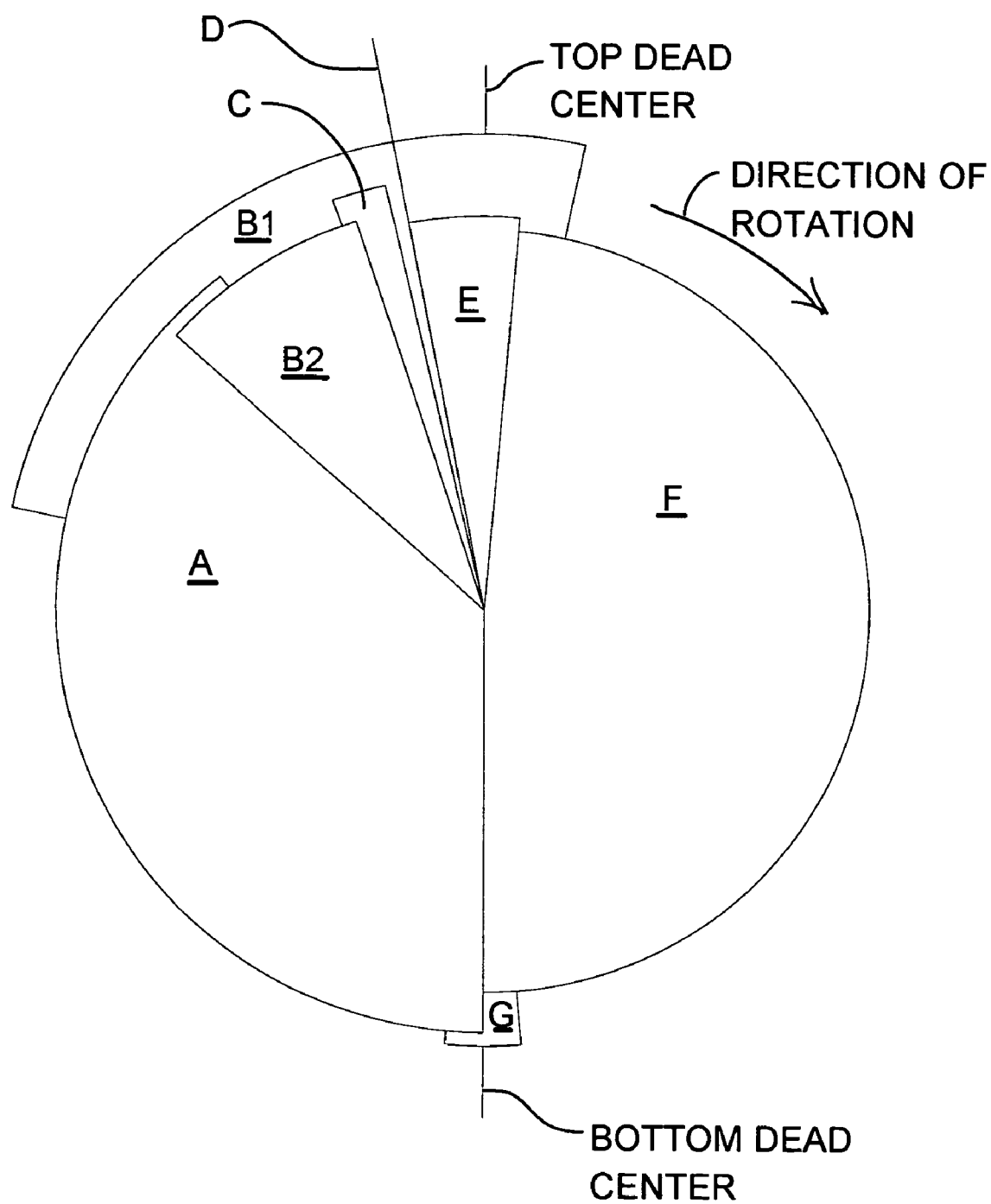
FIG. 3 is a timing diagram showing the timing of segments A–G of the combustion cylinder cycle shown in FIGS. 3A–FIG. 3H and the combustion cylinder cycle shown in FIGS. 4A–4H.
Figure 3A:
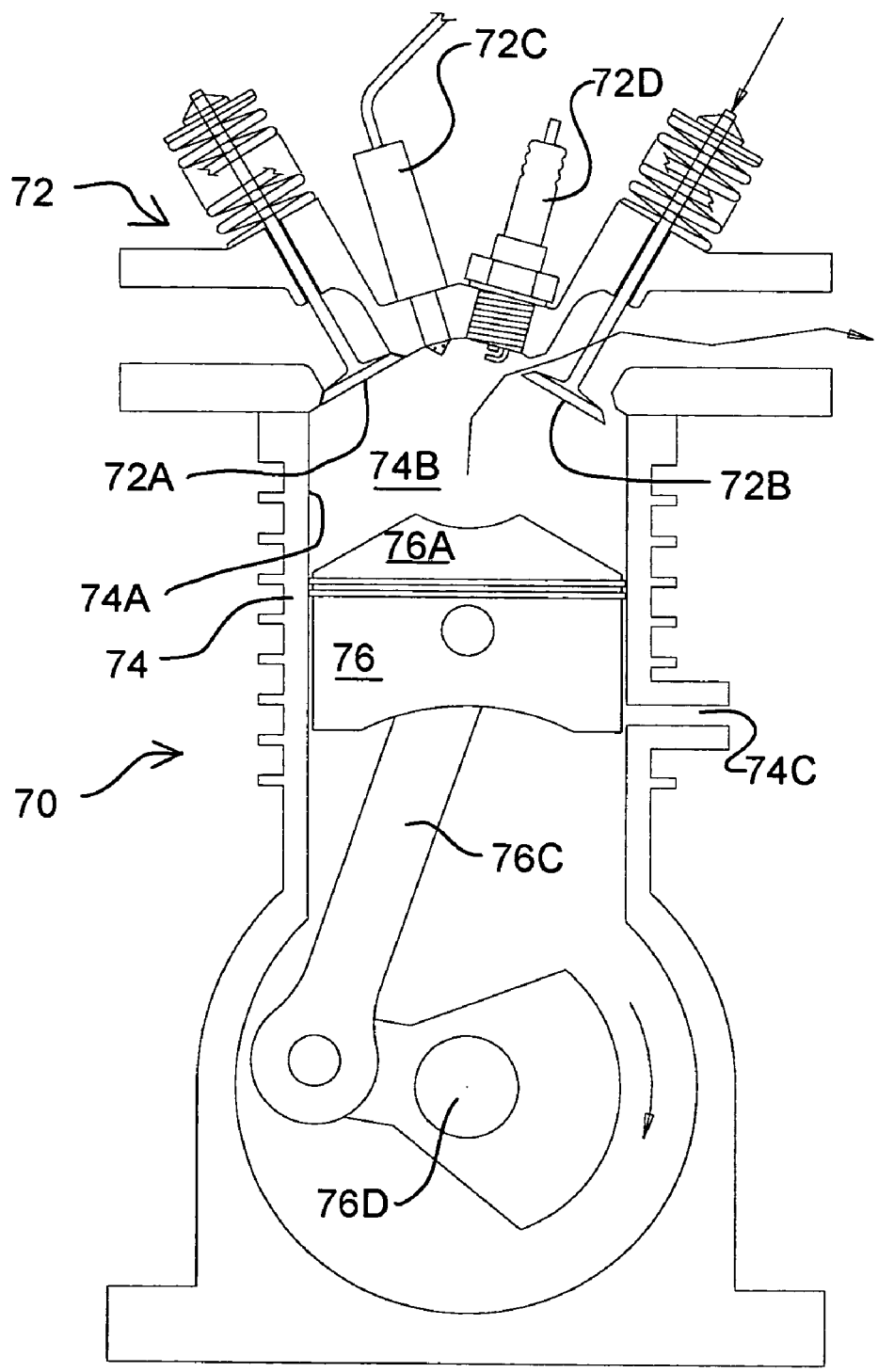
FIG. 3A shows the combustion cylinder during cycle segment A as gaseous combustion products remaining from a previous cycle are being expelled through the exhaust valve.
Figure 3B:
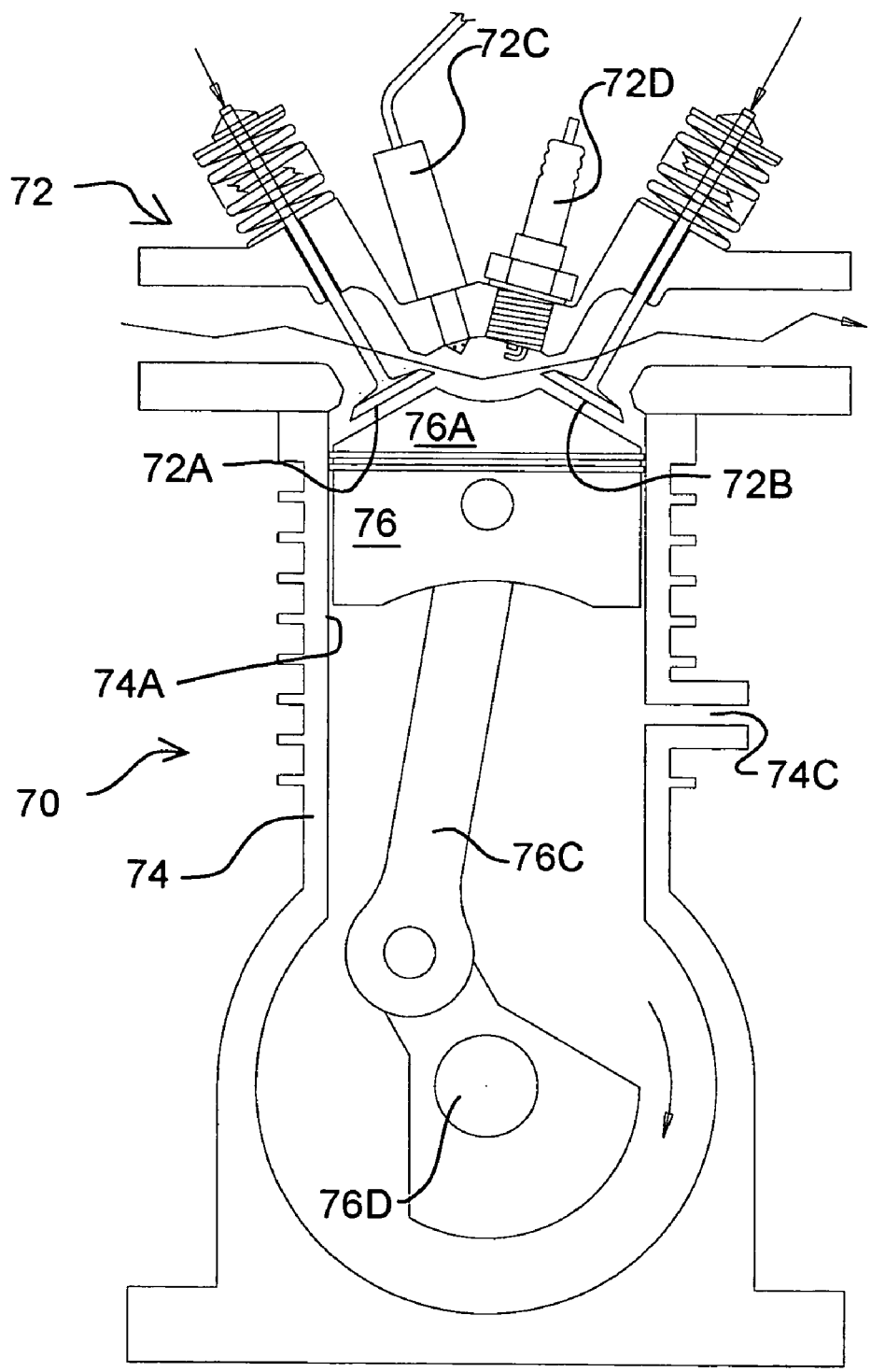
FIG. 3B shows the combustion cylinder during cycle segment where A and B2 overlap when the pressurized air injection valve and the exhaust valve are both open in order to scavenge the last remaining gaseous combustion products from the previous cycle.
Figure 3C:
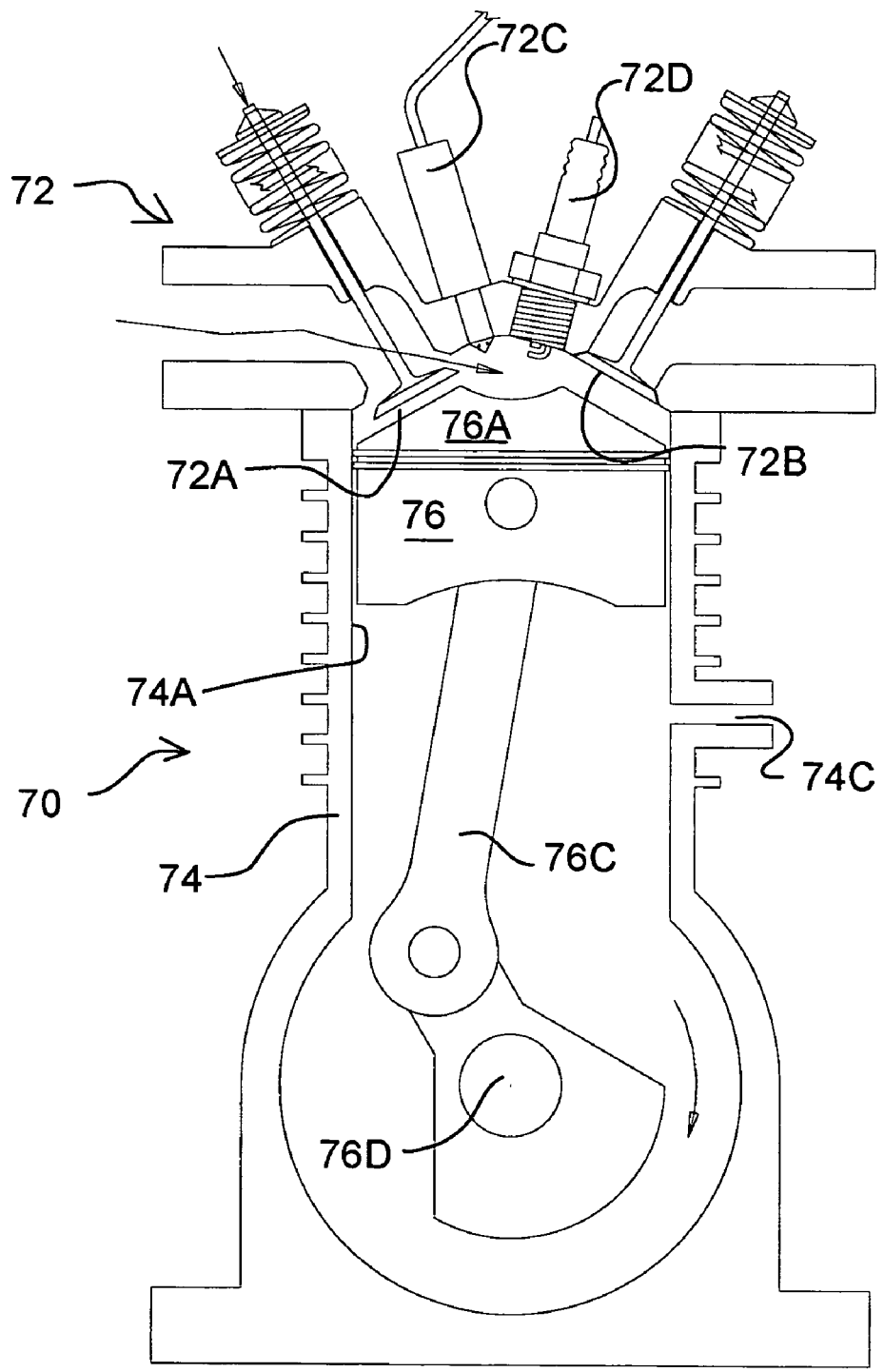
FIG. 3C shows the combustion cylinder during cycle segment B2 as pressurized air is being injected into the combustion cylinder.
Figure 3D:
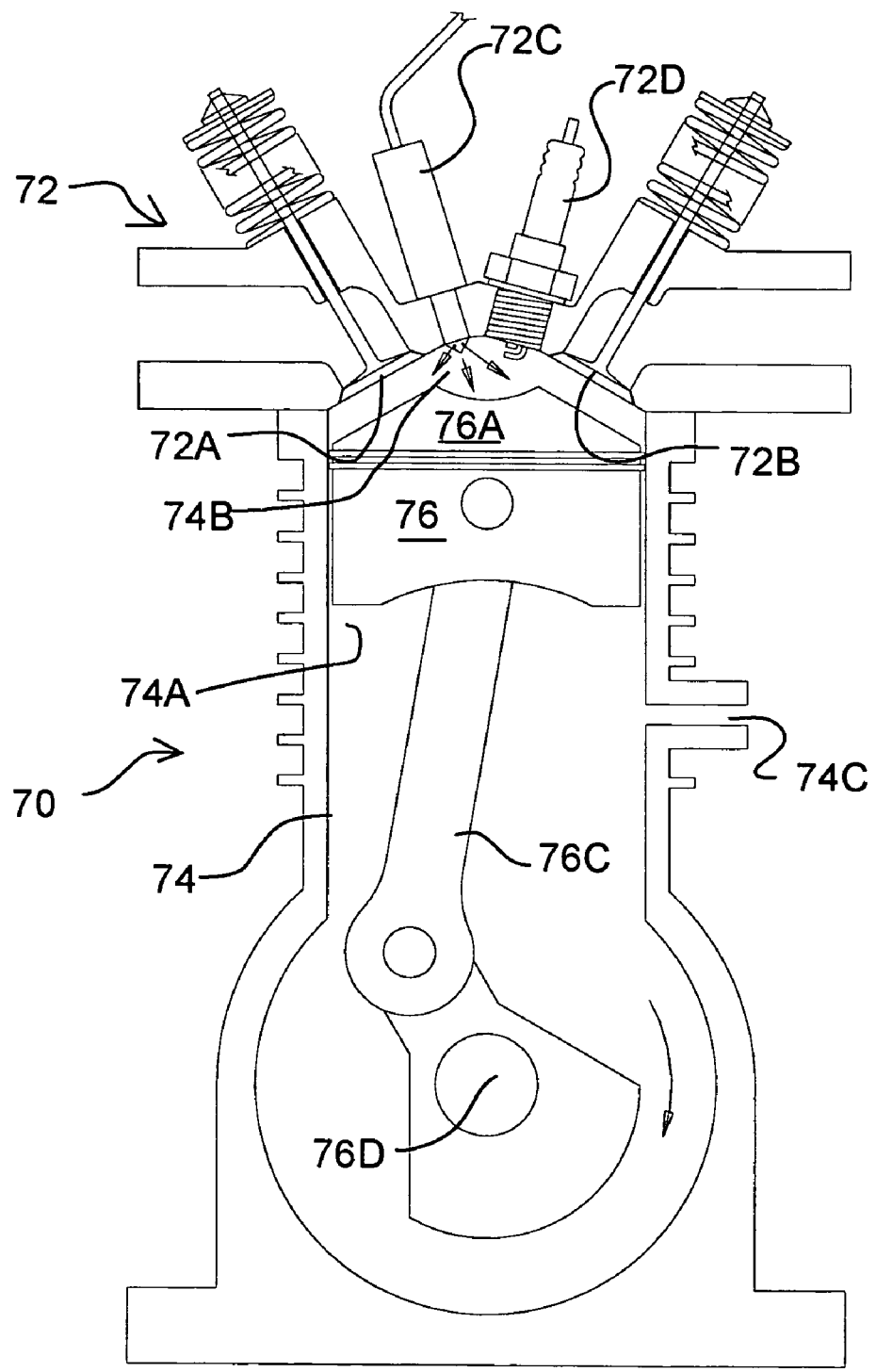
FIG. 3D shows the combustion cylinder during cycle segment C as fuel is being injected into the combustion cylinder.
Figure 3E:
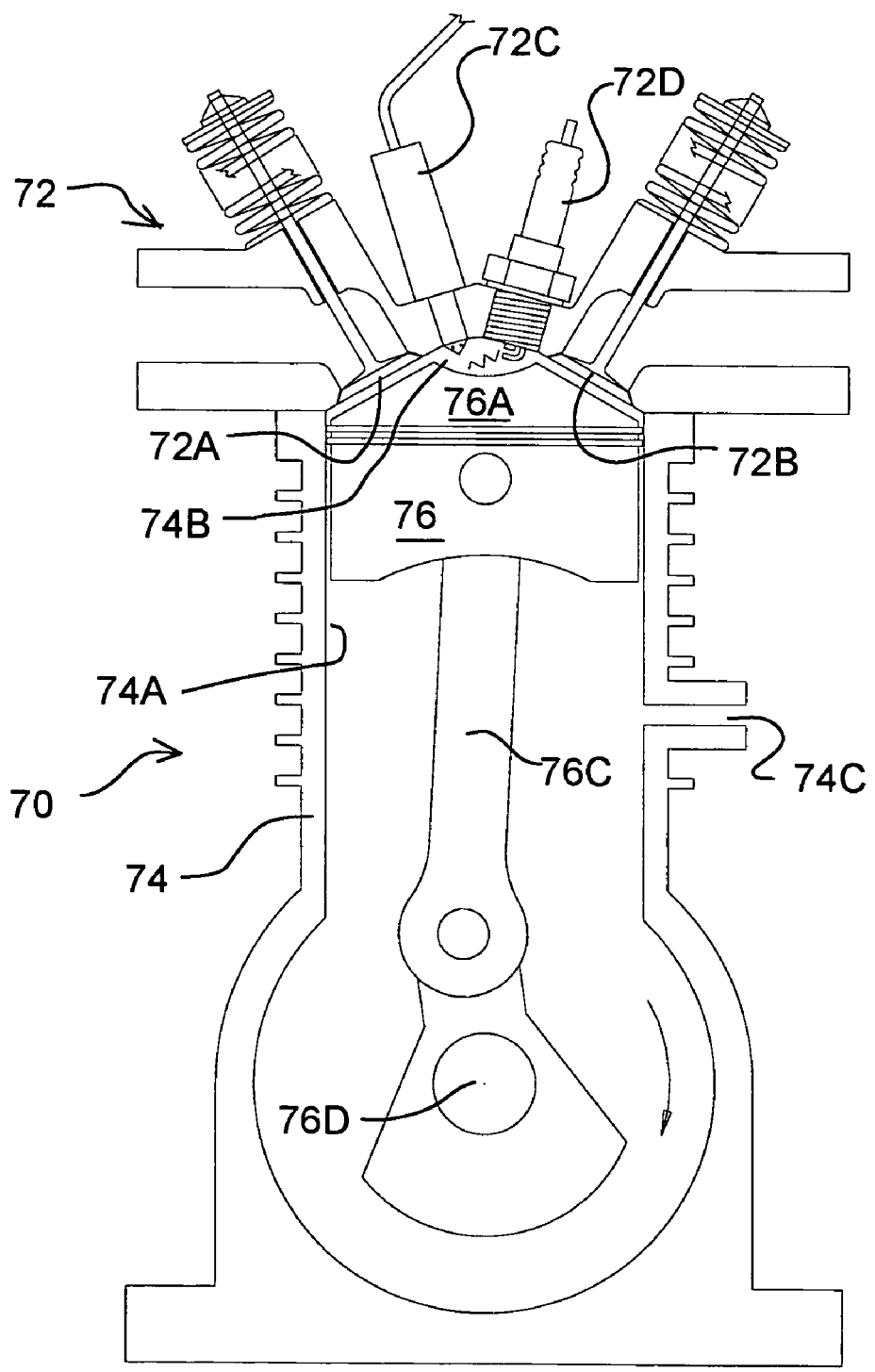
FIG. 3E shows the combustion cylinder during cycle point D where the combustion piston is near top dead center and the fuel air mixture is being ignited by a spark plug.
Figure 3F:
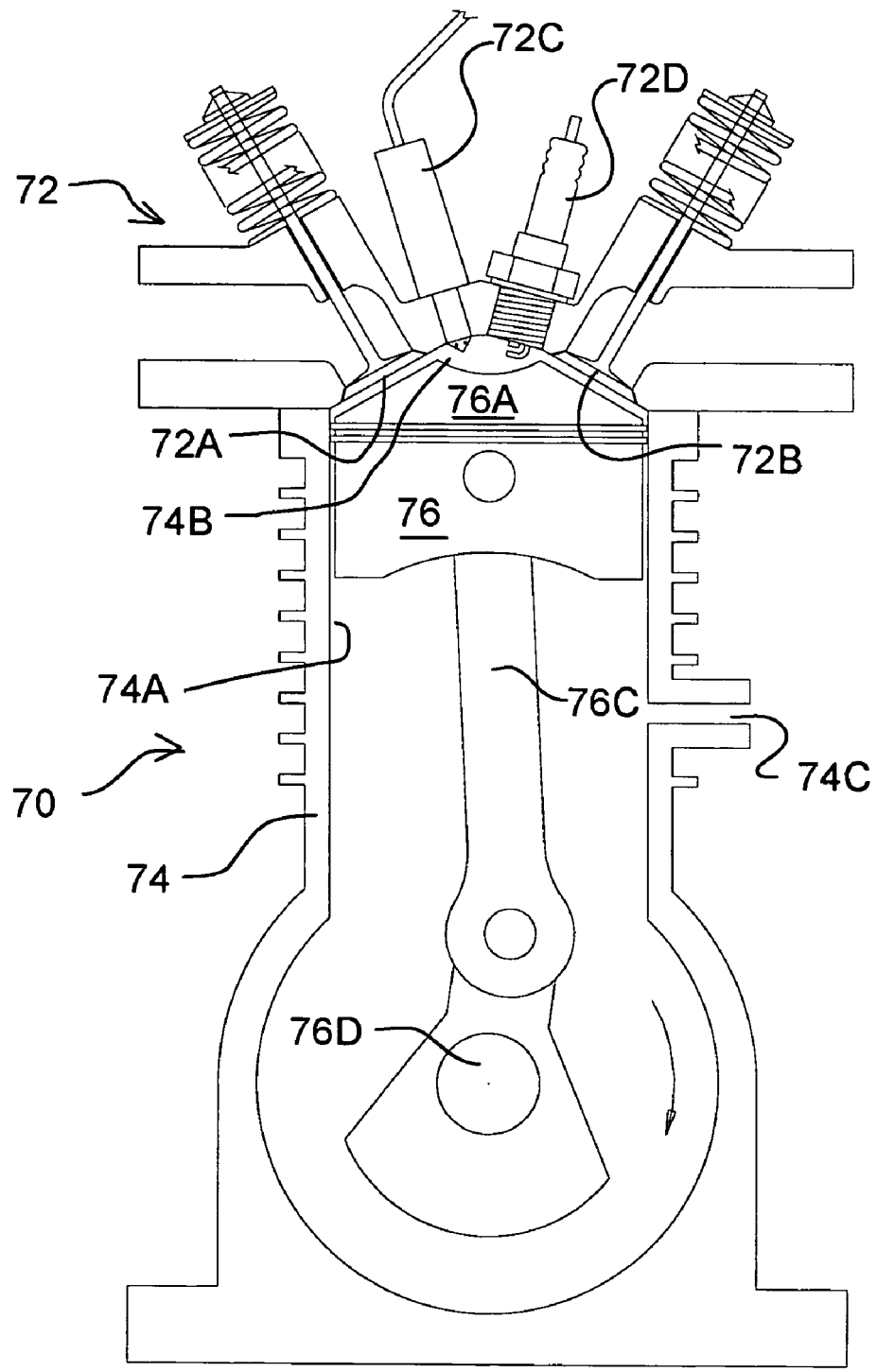
FIG. 3F shows the combustion cylinder during cycle segment E where the combustion piston is at top dead center as the fuel air mixture is in the process of combustion.
Figure 3G:
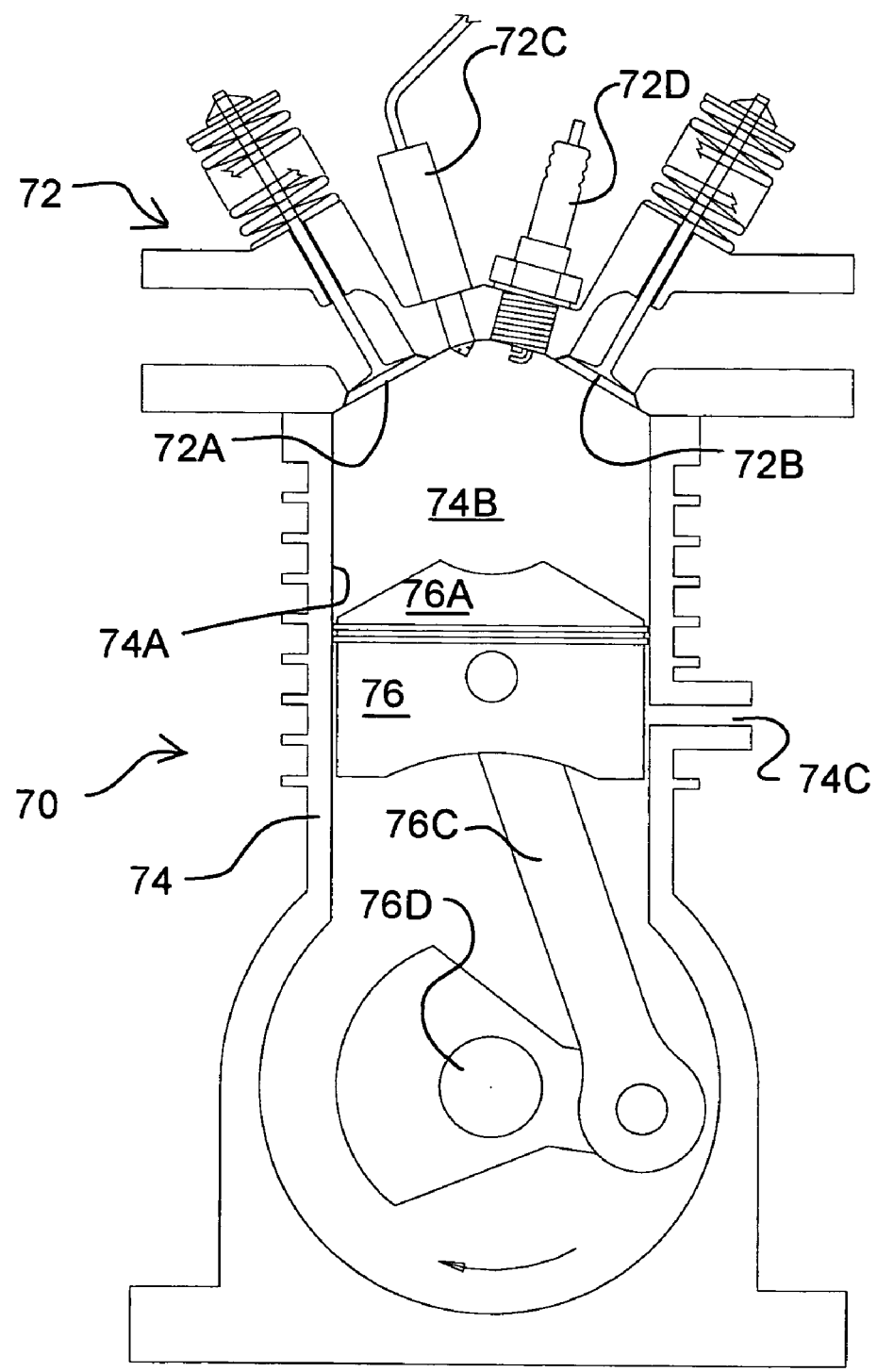
FIG. 3G shows the combustion cylinder during cycle segment F during the power stroke as combustion product gases are expanding.
Figure 3H:
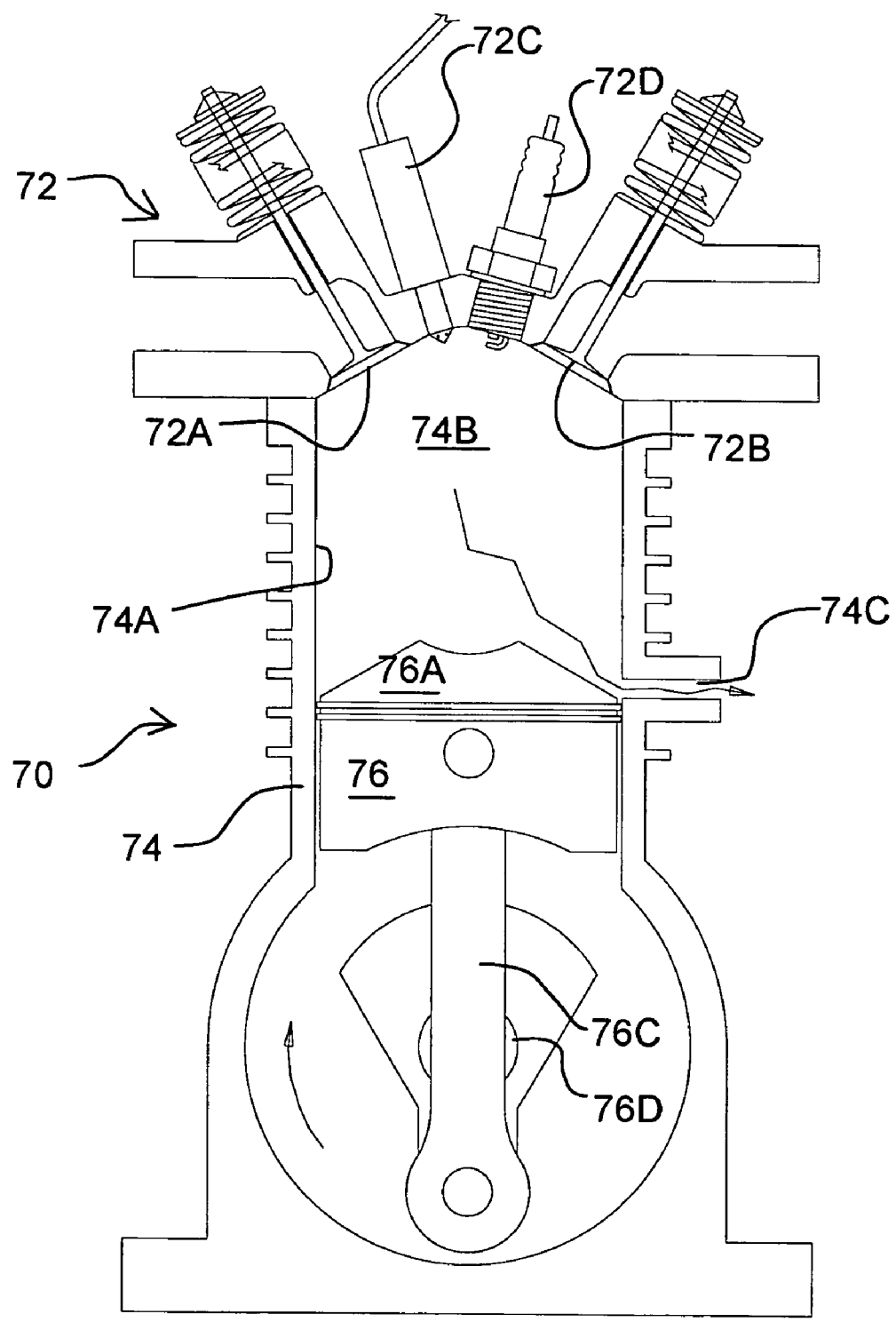
FIG. 3H shows the combustion cylinder during optional cycle segment G where the combustion piston is at bottom dead center as gaseous combustion products escape through the exposed exhaust port.
Figure 4A:
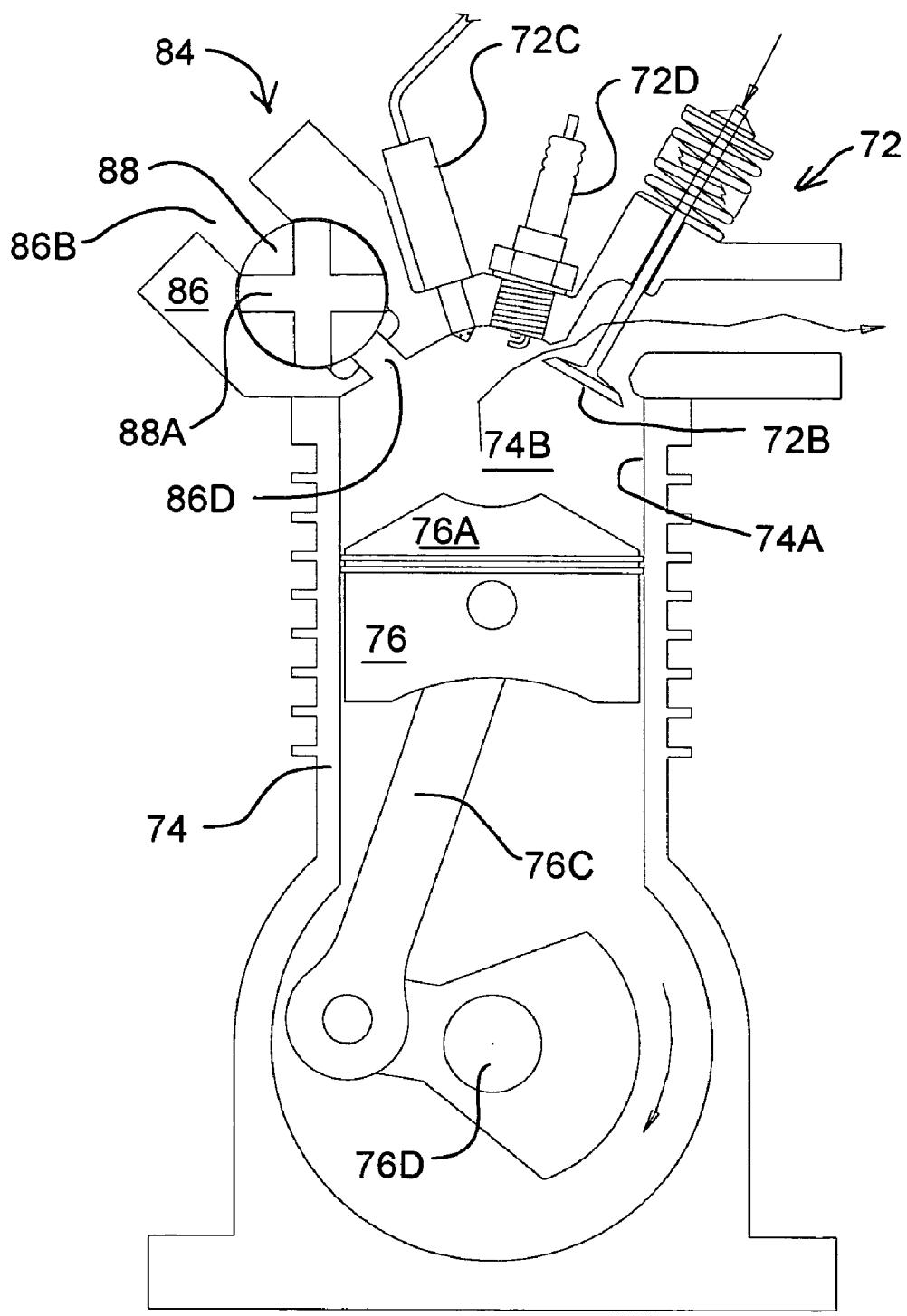
FIG. 4A shows the combustion cylinder including a rotary injection valve during cycle segment A as gaseous combustion products remaining from a previous cycle are being expelled through the exhaust valve.
Figure 4B:
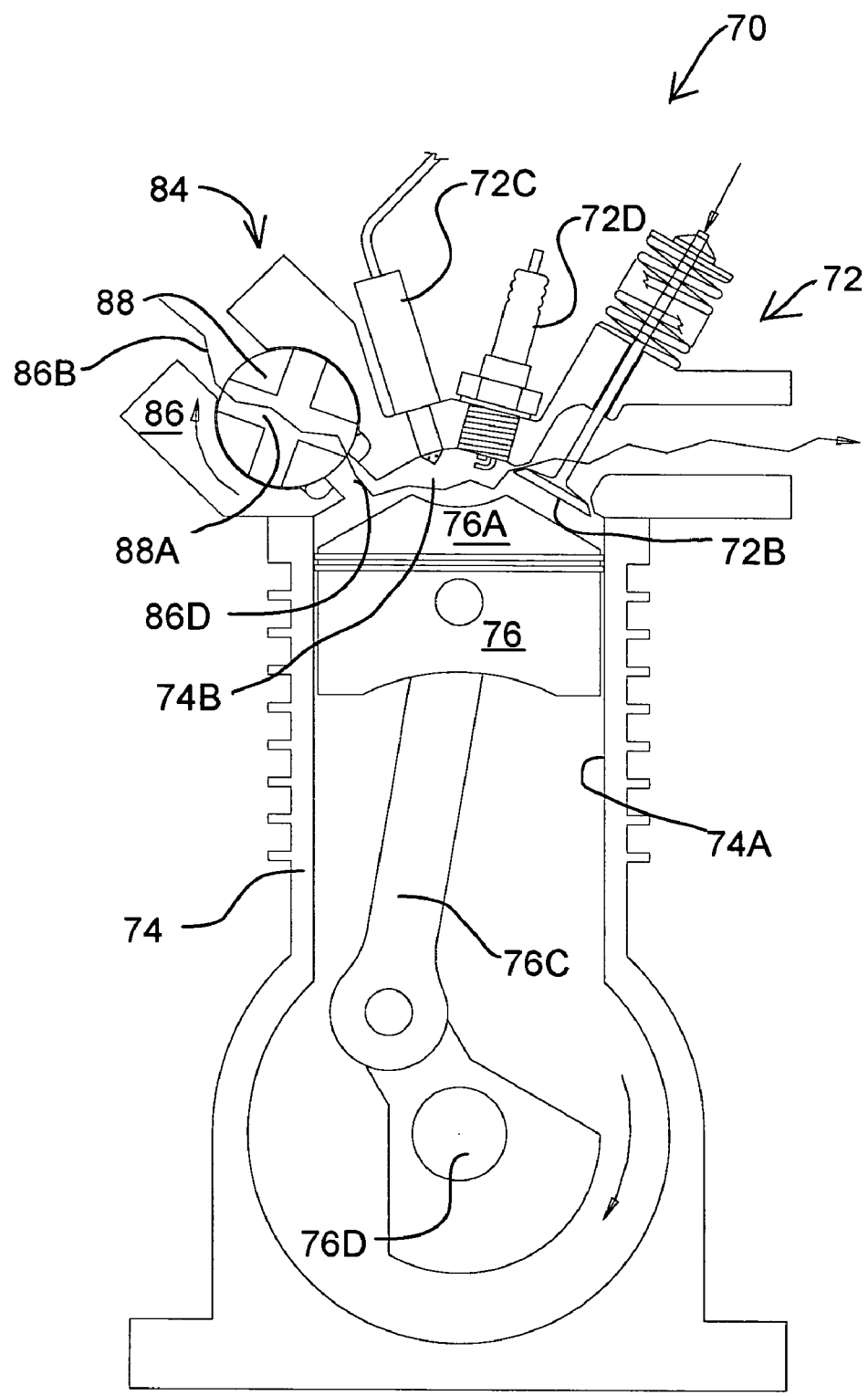
FIG. 4B shows the combustion cylinder including a rotary injection valve during cycle portion where A and B2 overlap when the pressurized air injection valve and the exhaust valve are both open in order to scavenge the last remaining gaseous combustion products from the previous cycle.
Figure 4C:
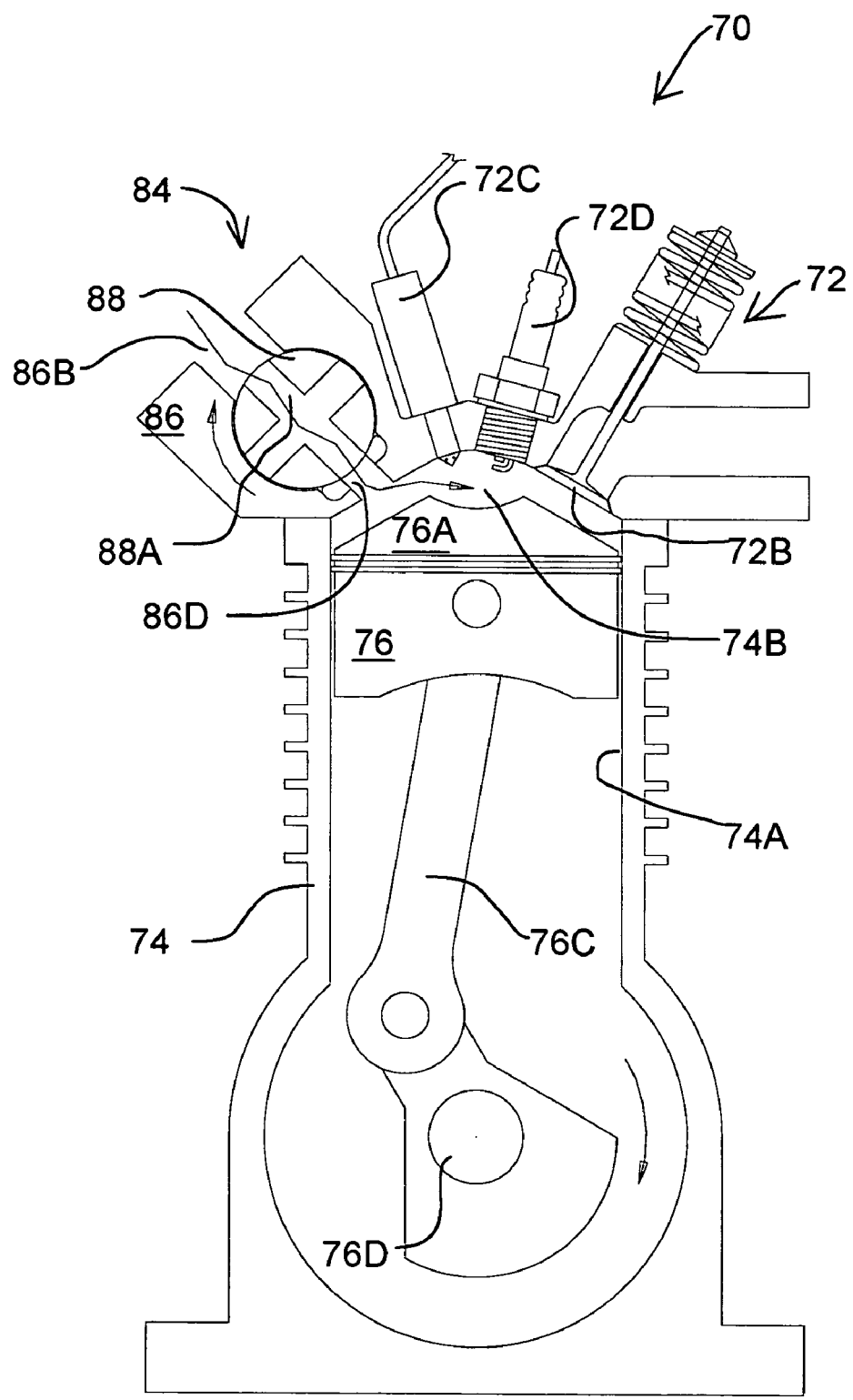
FIG. 4C shows the combustion cylinder including a rotary injection valve during cycle segment B2 as pressurized air is being injected into the combustion cylinder.
Figure 4D:
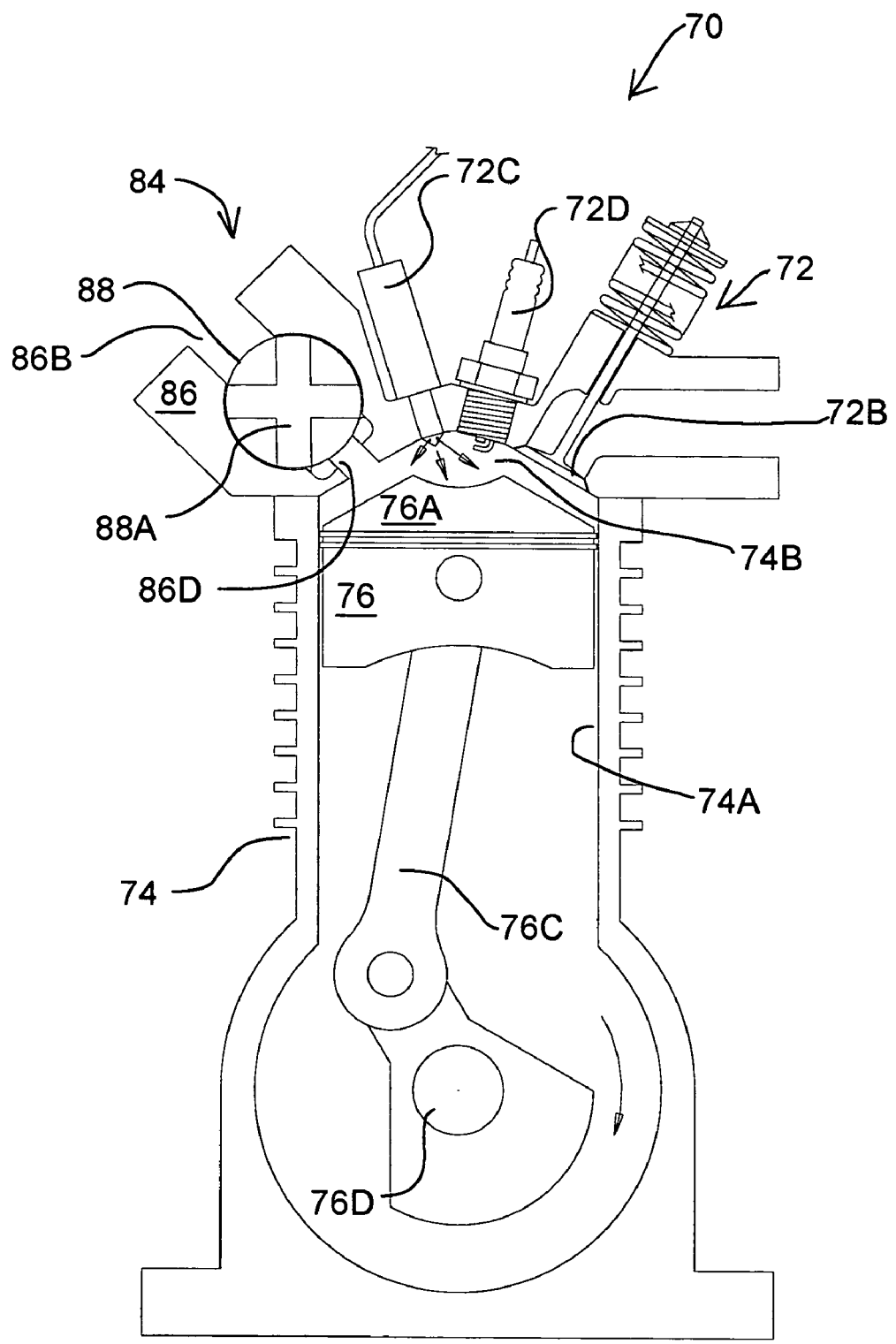
FIG. 4D shows the combustion cylinder including a rotary injection valve during cycle segment C as fuel is being injected into the combustion cylinder.
Figure 4E:
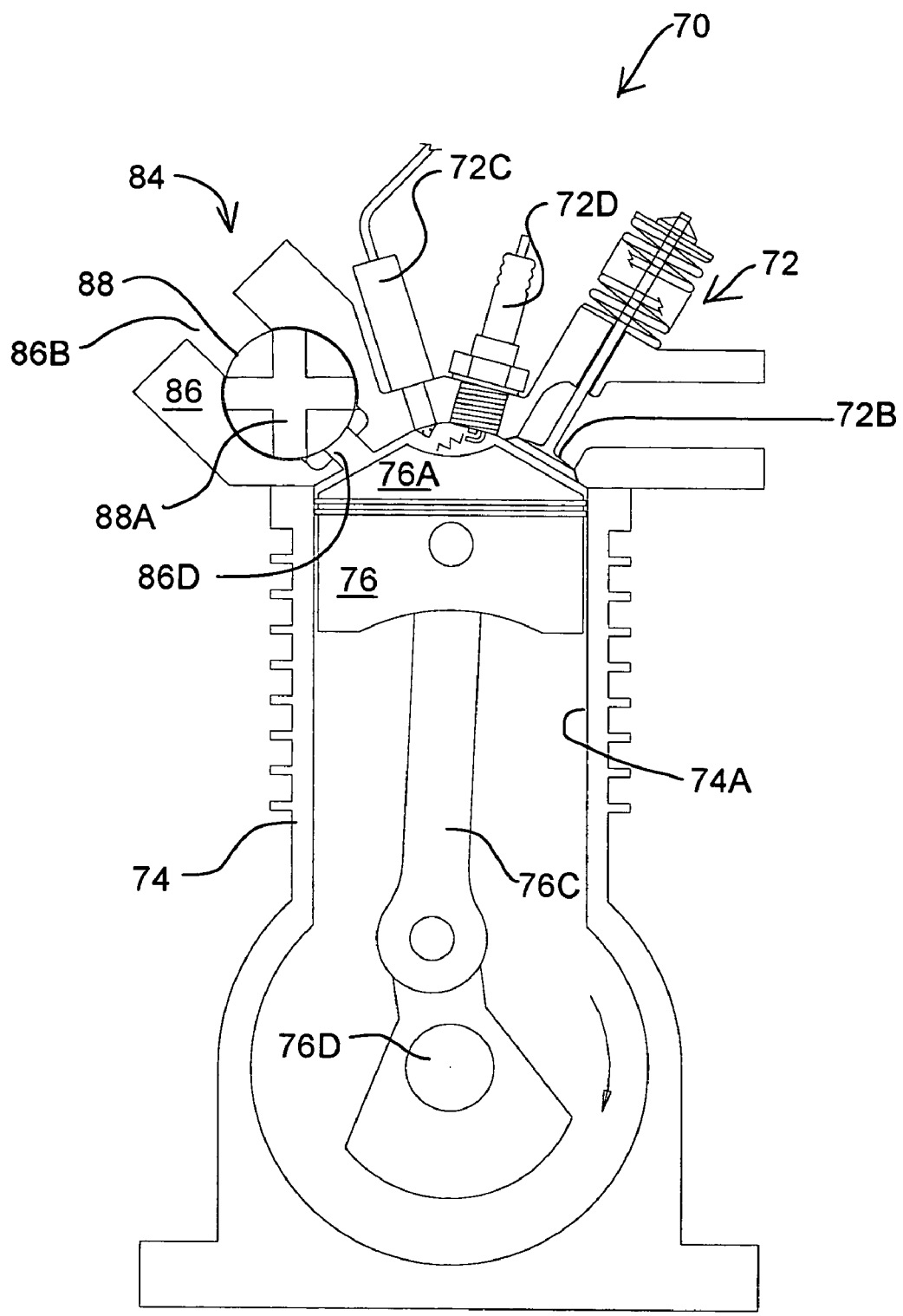
FIG. 4E shows the combustion cylinder including a rotary injection valve during cycle point D where the combustion piston is near top dead center and the fuel air mixture is being ignited by a spark plug.
Figure 4F:
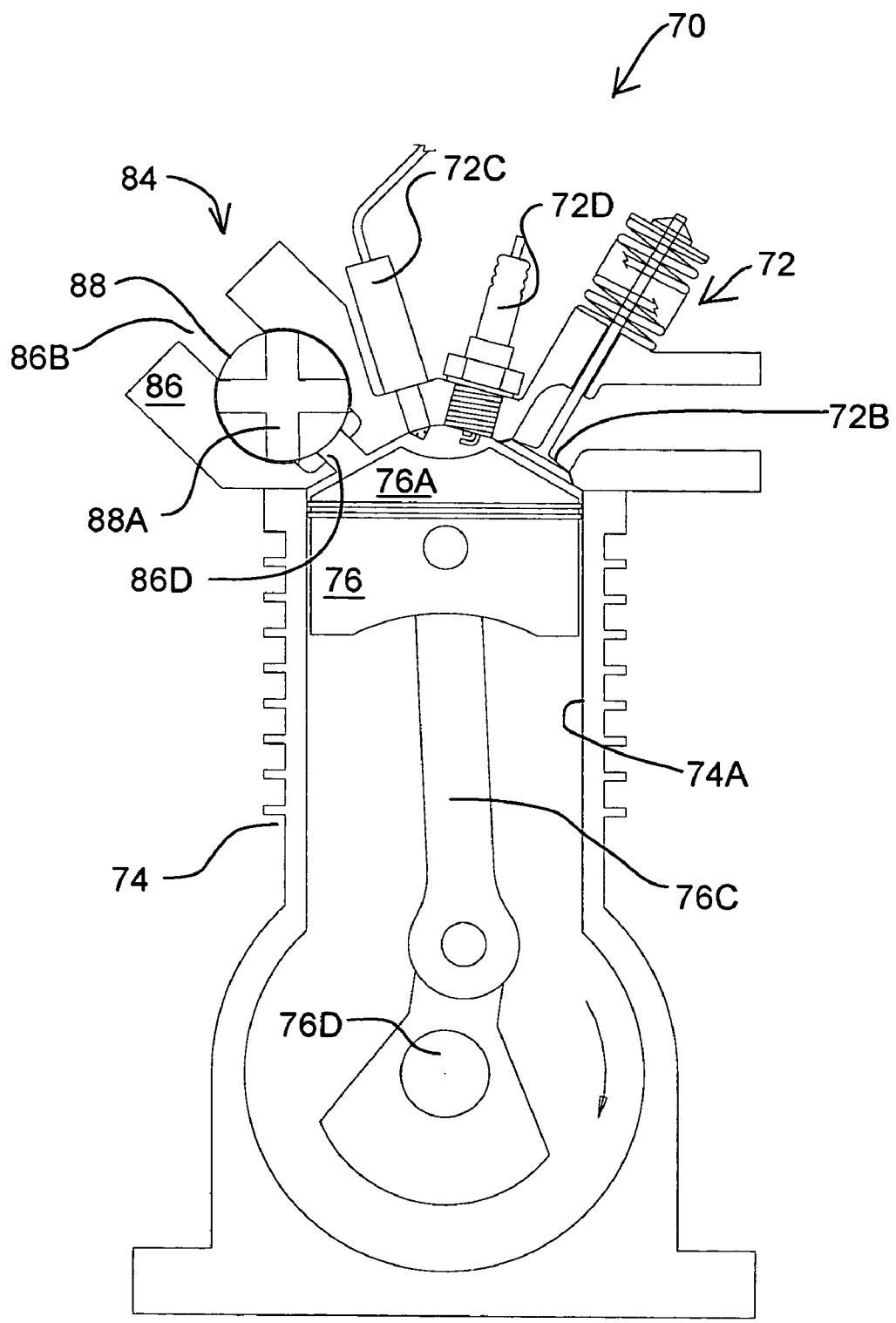
FIG. 4F shows the combustion cylinder including a rotary injection valve during cycle segment E where the combustion piston is at top dead center as the fuel air mixture is in the process of combustion.
Figure 4G:
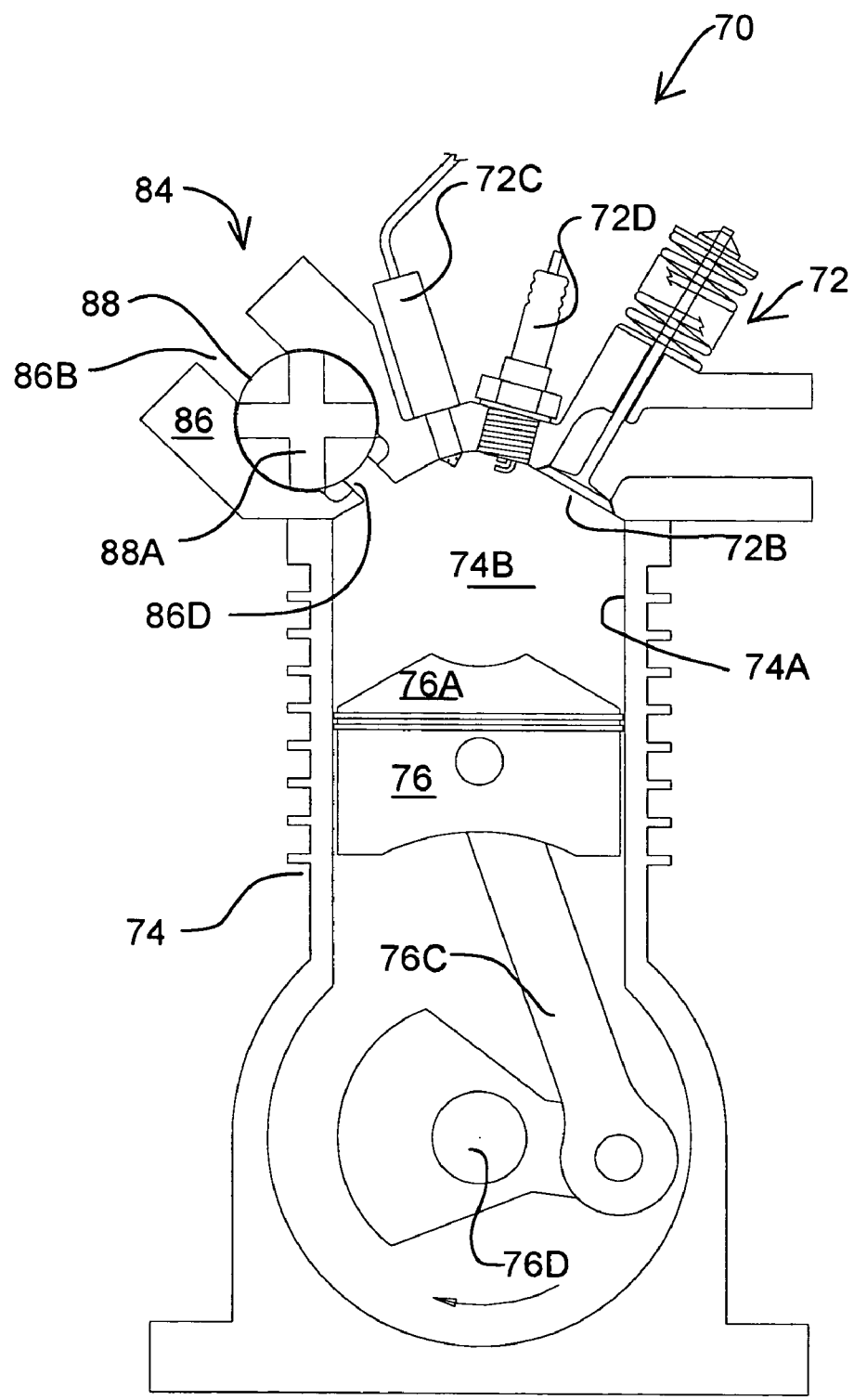
FIG. 4G shows the combustion cylinder during cycle segment F during the power stroke as combustion product gases are expanding.
Figure 4H:
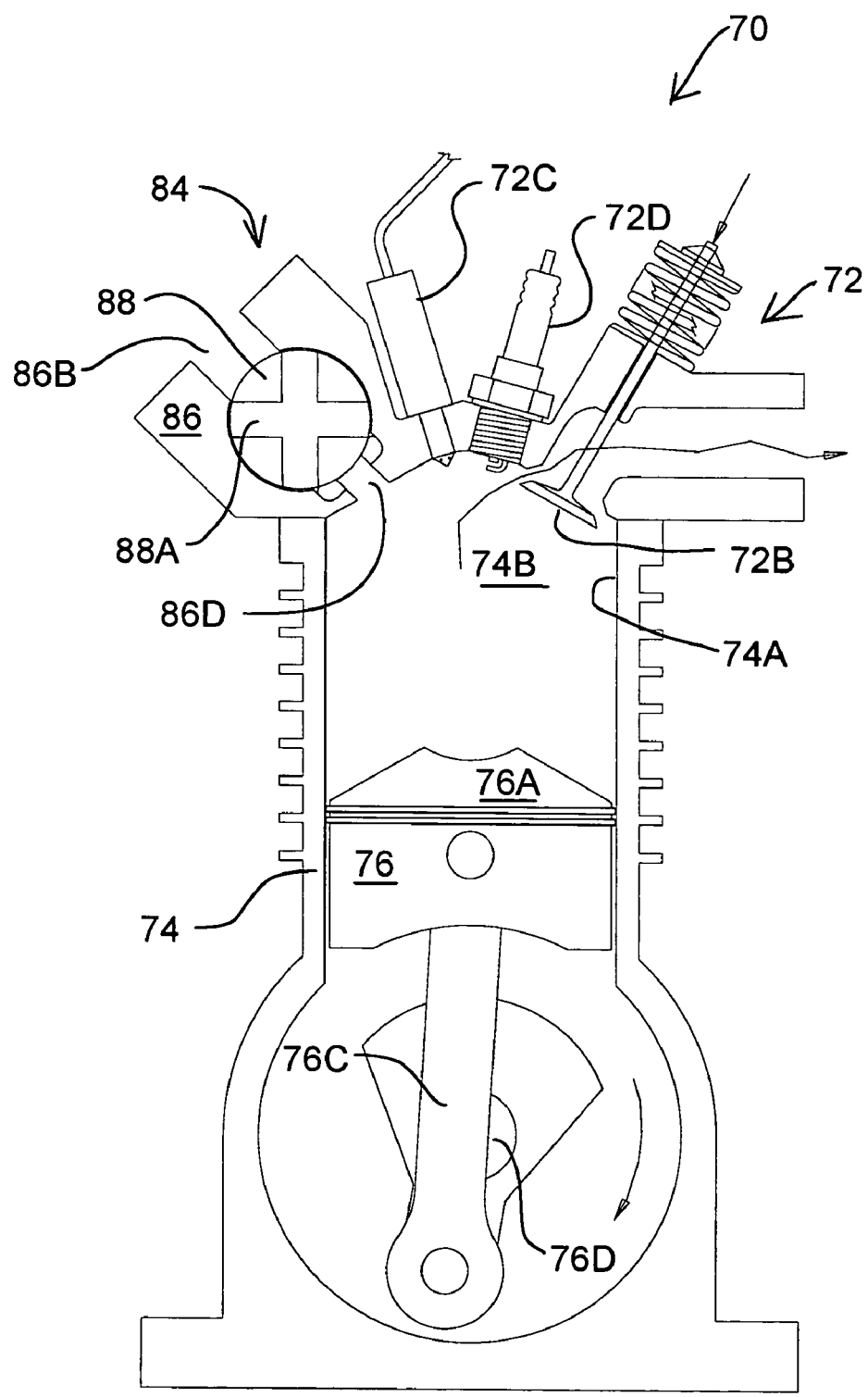
FIG. 4H shows the combustion cylinder during optional cycle segment G where the combustion piston is at bottom dead center as gaseous combustion products escape through the exposed exhaust port.

Combustion cylinder 70 receives compressed air from compressed air conduit 50 as well as fuel which is mixed with the compressed air for combustion and expansion in a power stroke. In the embodiment shown in FIG. 1, combustion cylinder 70 is a two stroke cylinder having a piston which oscillates in a cycle including a power stroke in which the piston moves from a top dead center position to a bottom dead center position and a return stroke in which the piston moves from the bottom dead center position to the top dead center position. Generally, the injection of compressed air from compressed air conduit 50 into combustion cylinder 70 is timed to occur during a relatively short portion of the cycle when the piston is in the second half of the return stroke. Also generally, the injection of fuel into combustion cylinder 70 is preferably timed to occur after the injection of compressed air has begun. The combustion of the fuel air mixture preferably occurs after the injection of compressed air and fuel and preferably not substantially prior to the piston reaching top dead center. In the embodiment shown in FIG. 1, combustion cylinder 70 further includes a combustion cylinder head 72, a combustion cylinder body 74 and a combustion piston 76 having an upper piston surface 76A. A connecting rod 76C links combustion piston 76 to an associated crankshaft 76D for the conversion of the reciprocating motion of the piston into rotational power at the crankshaft 76D. Combustion cylinder body 74 includes a cylindrical inside wall 74A which may be penetrated by an optional exhaust port 74C. Exhaust port 74C and exhaust valve 72B are examples of typical devices or means employed for releasing exhaust from a combustion chamber. Combustion cylinder head 72 further includes an injection valve 72A, an exhaust valve 72B, a fuel injector 72C and may also include an ignition initiator 72D which in FIG. 1 is shown as a spark plug. Combustion cylinder 70 may optionally be arranged as a Diesel cylinder which compresses a mixture of air and fuel to a sufficient pressure to cause auto ignition of the mixture. As a Diesel cylinder, combustion cylinder 70 would not need ignition initiator 72D. Combustion cylinder head 72, inside wall 74A of cylinder body 74 and upper piston surface 76A define a combustion chamber 74B which constantly changes in volume as piston 76 moves between a bottom dead center position as shown in FIG. 3H or 4H and a top dead center which would appear to be half way between the positions shown in FIGS. 3E and 3F or FIGS. 4E and 4F.

FIG. 1 illustrates combustion cylinder 70 such that injection valve 72A is a conventional stem valve. FIGS. 3A–3H illustrate the operation of power cylinder 70 with a conventional stem valve. With a typical prior art engine, a stem valve for regulating air intake may be open during a relatively large portion of crankshaft cycle corresponding to approximately 180 degrees of crankshaft rotation. With the present engine, injection valve 72A may be open during a relatively small portion of the crankshaft cycle corresponding to 10 to 15 degrees of the crankshaft rotation. Because of the mechanical characteristics of stem valves, the actuation of a stem valve for such a small portion of the crankshaft cycle may limit the operating RPM of power cylinder 70. Accordingly, in order to achieve higher RPMs, it would be preferable to employ a valve arrangement capable of substantially equalizing the pressure between the pressurized portion of the system such as outlet portion 66 of compressed air conduit 50 and combustion chamber 74B during a relatively small portion of the crankshaft cycle. FIGS. 3J–3N illustrate an indexed rotary valve 82 adapted for filling combustion chamber 74B with pressurized air during a relatively small portion of the cycle. Also shown in FIG. 3I is an example timing system 300 which includes a timing chain 300B coupled to crankshaft 76D for driving a cam shaft 302 for actuating exhaust valve 72B, a timing sensor 300A associated with drive wheel 92 of rotary valve 82 which is also driven by timing chain 300B and a timing unit 305 which receives input from timing sensor 300A for controlling the timing of fuel injector 72C and ignition initiator 72D.

Figure 3I:
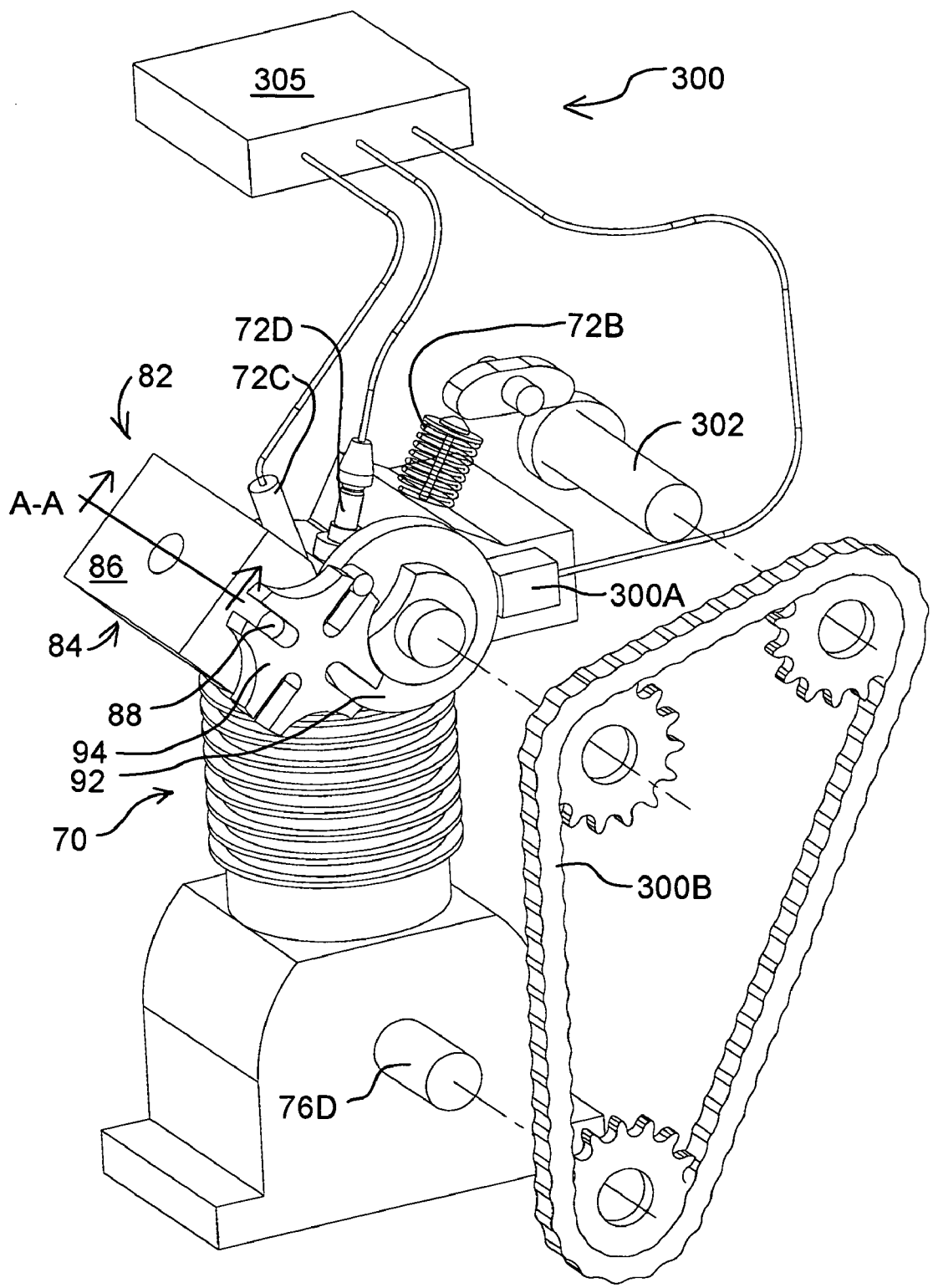
FIG. 3I is an isometric view of the combustion cylinder with an indexed rotary valve.
Figure 3J:
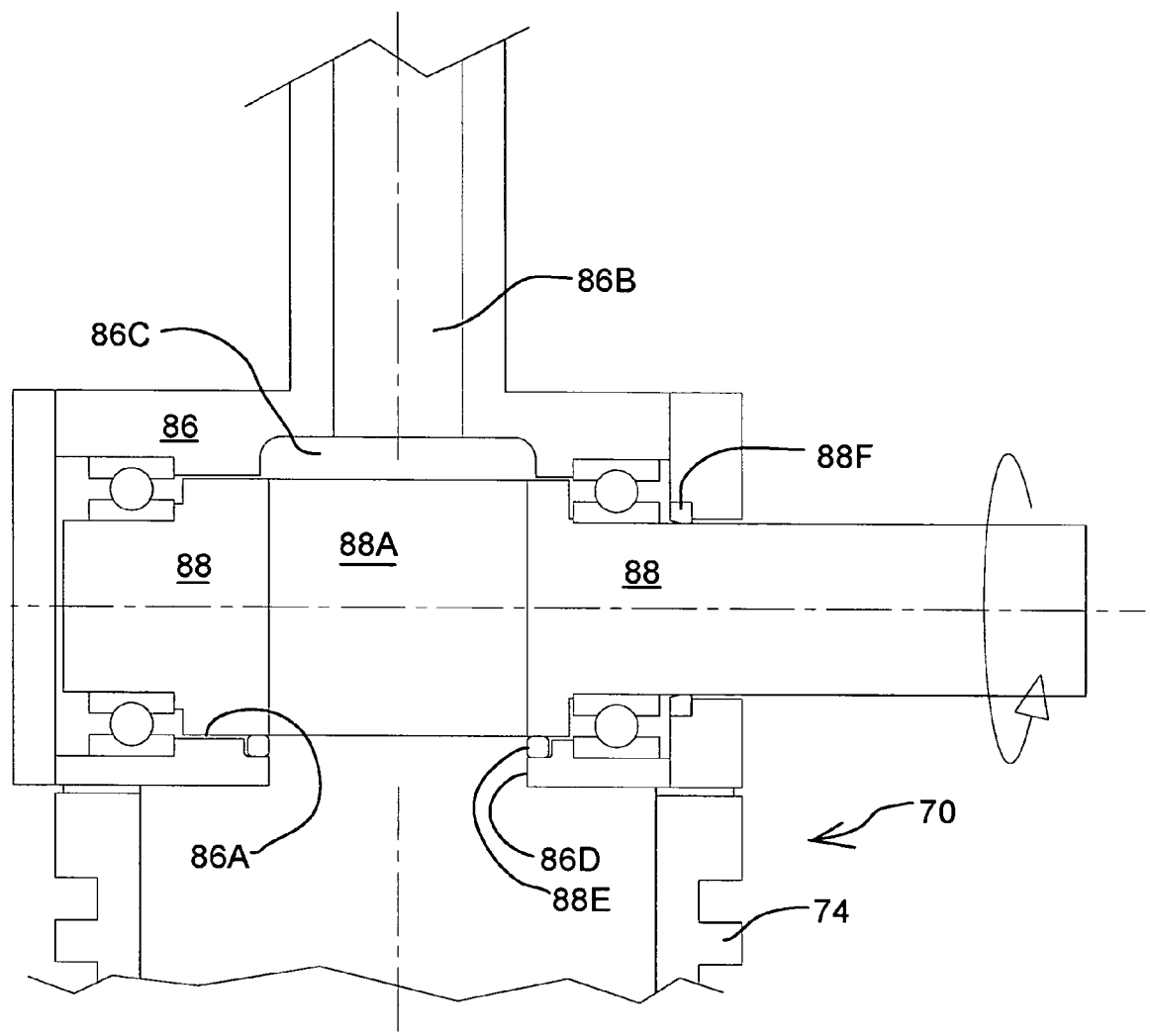
FIG. 3J is an cross sectional view showing a cross section of the valve housing, the valve body and the combustion cylinder generally taken from plane A—A of FIG. 3I except with the valve body in the position shown in FIG. 3L

As can be seen with reference to FIG. 3I, rotary valve 82 generally includes a valve portion 84 and an indexing portion 90. Valve portion 84 is mounted to power cylinder 70 as shown in FIG. 3I. Valve portion 84 may be best understood by referring to FIGS. 3J–3M. The cross section view of FIG. 3J is taken from plane A—A of FIG. 3I, except that valve body 88 in FIG. 3J is rotated to a position corresponding to that shown in FIG. 3M. As can be best seen in FIG. 3J, valve portion 84 includes a valve housing 86 which rotatably carries a valve body 88. Valve body 88 includes two intersecting passages 88A of generally oval cross-section which are arranged at right angles with respect to each other. Valve housing 86 has a compatible longitudinal bore 86A for carrying valve body 88 as well as bearings adapted for high speed rotation of valve body. Valve housing 86 includes a pressurized air conduit opening 86B which opens up to a generally oval shaped inlet port 86C. Inlet port 86C may be generally shaped to match the shape of passages 88A of valve body 88. However, inlet port 86C is preferably not sealed against valve body 88 so that passages 88A are constantly in communication with the pressurized volume inside housing 86 and thus outlet portion 66 of pressurized conduit 50. This constant pressurization of passages 88A occurs regardless of their rotational position within valve housing 86. Valve housing 86 includes an oval shaped injection port 86D which is oval shaped to match the shape of passages 88A. However, unlike inlet port 86C, injection port 86D is sealed between valve body 88 and the constantly pressurized internal volume of valve housing 86 by an injection seal 88E. A second housing seal 88F seals the pressurized internal volume of valve housing 86 and passages 88A from the outside environment. The above described compatible ports and passages are preferably shaped to maximize pneumatic communication between the pressurized portion of the system and combustion chamber 74B.

Figure 3P:
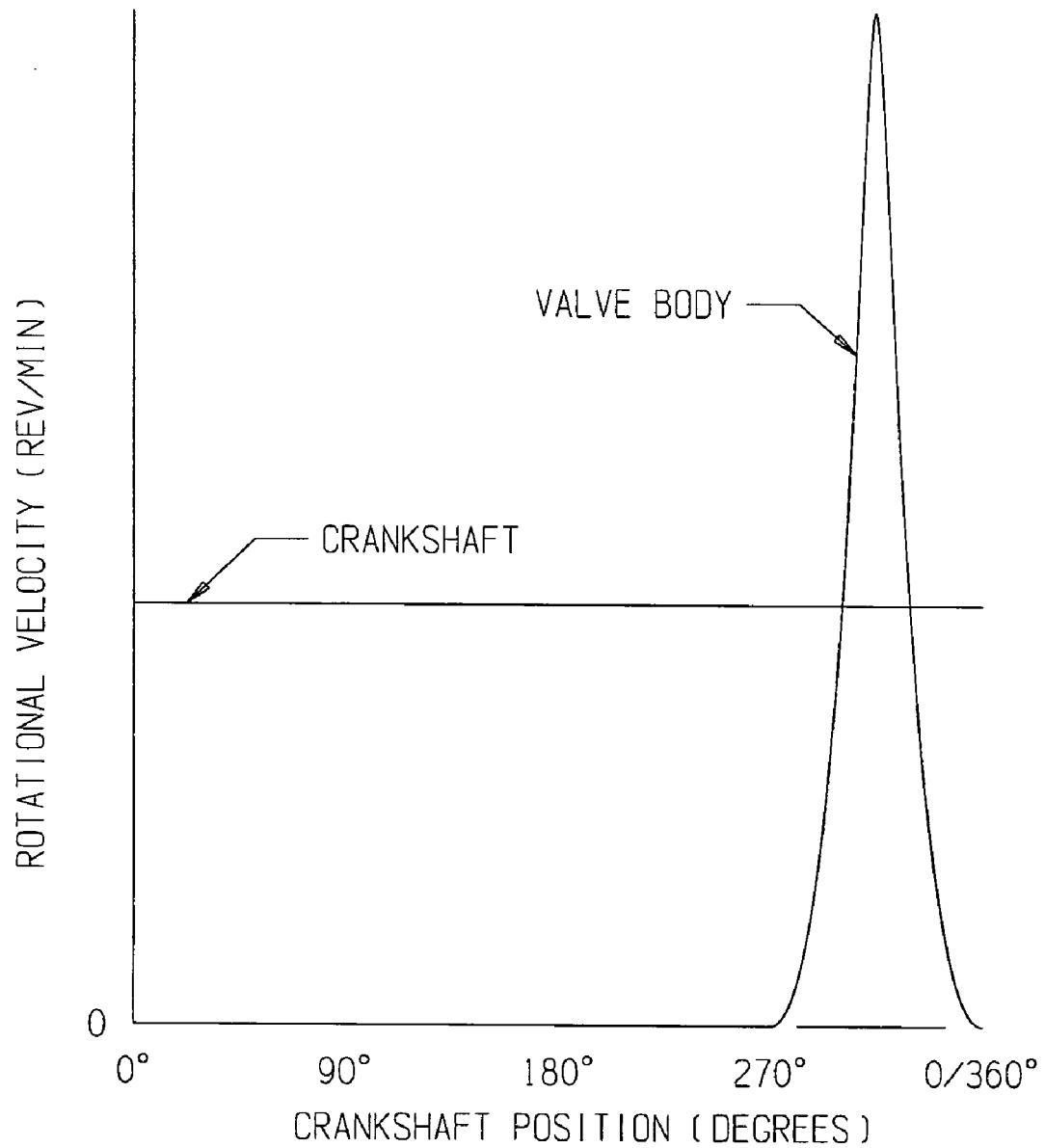
FIG. 3P is an plot showing valve body rotational velocity as a function of crankshaft position for the indexed rotary valve arrangement shown in FIGS. 3I–3N.

The purpose of indexing portion 90 is to cause the intermittent (or "indexed") 90 degree rotation of valve body 88 during a 90 degree portion of a complete cycle of constantly rotating crankshaft 76D. Indexing portion 90 includes a drive wheel 92 mechanically coupled to crankshaft 76D for constant rotation and an index wheel 94 mechanically coupled to valve body 88 for intermittent, indexed rotation. Drive wheel 92 includes a cog 92A and a retaining disc 92B having a scalloped portion 92C and a non-scalloped circular retaining portion 92D. Index wheel 94 includes slots 94A for receiving cog 92A and external scallops 94B for receiving non-scalloped retaining portion 92D of retaining disc 92B. FIGS. 3K–3N illustrate the relative motions of continuously rotating drive wheel 92 and intermittently rotating index wheel 94. Valve housing 86 has been removed in FIGS. 3K–3N for clarity. In FIG. 3K, drive wheel 92 is beginning a period of rotation in which it rotates clockwise for 270 degrees while index wheel 94 remains stationary in a position that blocks communication between inlet passage 86C and combustion cylinder 70. In FIG. 3L, cog 92A of drive wheel 92 has traveled clockwise 270 degrees and begins to engage slot 94A of index wheel 94 thus causing index wheel 94 to begin rotating in a counter clockwise direction. In FIG. 3M, index wheel 94 is rotating at a high speed relative to crankshaft 76D and drive wheel 92. The relative positions of valve body 88 and valve housing 84 illustrated in FIG. 3M are also shown in the cross sectional view of FIG. 3J. In FIG. 3N, index wheel 94 has advanced 90 degrees from the position shown in FIG. 3M and is again stationary while continuously rotating drive wheel 92 has returned to the position shown in FIG. 3K. FIG. 3P provides plot which interrelates the rotational velocity of crankshaft 76D, which is constant, and the rotational velocity of valve body 88 which varies greatly during a 90 degree portion of the crankshaft cycle. The mechanism described here for driving the rotary valve is commonly known as a Geneva wheel mechanism and is only one of many possible ways to accomplish the above stated objective, which is, to open communication between a pressurized volume and combustion chamber 74B in a rapid and intermittent manner during a relatively small portion of the crankshaft cycle and to open such communication sufficiently to allow the substantial equalization of air pressure between the pressurized volume of the system and the combustion chamber.

FIG. 1 shows compression cylinder 13 almost half way through an intake stroke and combustion cylinder 70 at the beginning of the second half of the return stroke. However, these relative positions are not intended to imply a relationship between the two cylinders. In FIG. 1, no direct mechanical connection is shown between compression cylinder 13 and combustion cylinder 70. Compression cylinder 13 and combustion cylinder 70 can be coupled by a common crankshaft or could be coupled such they operate at substantially different speeds. The applicant intends however, that a portion of the power derived from the operation of combustion cylinder 70 be used to power compressor 12.

FIG. 1 illustrates compression cylinder 13 and combustion cylinder 70 as if they would be equivalent in quantity, size and shape. This would probably not be the case.

Figure 2A:
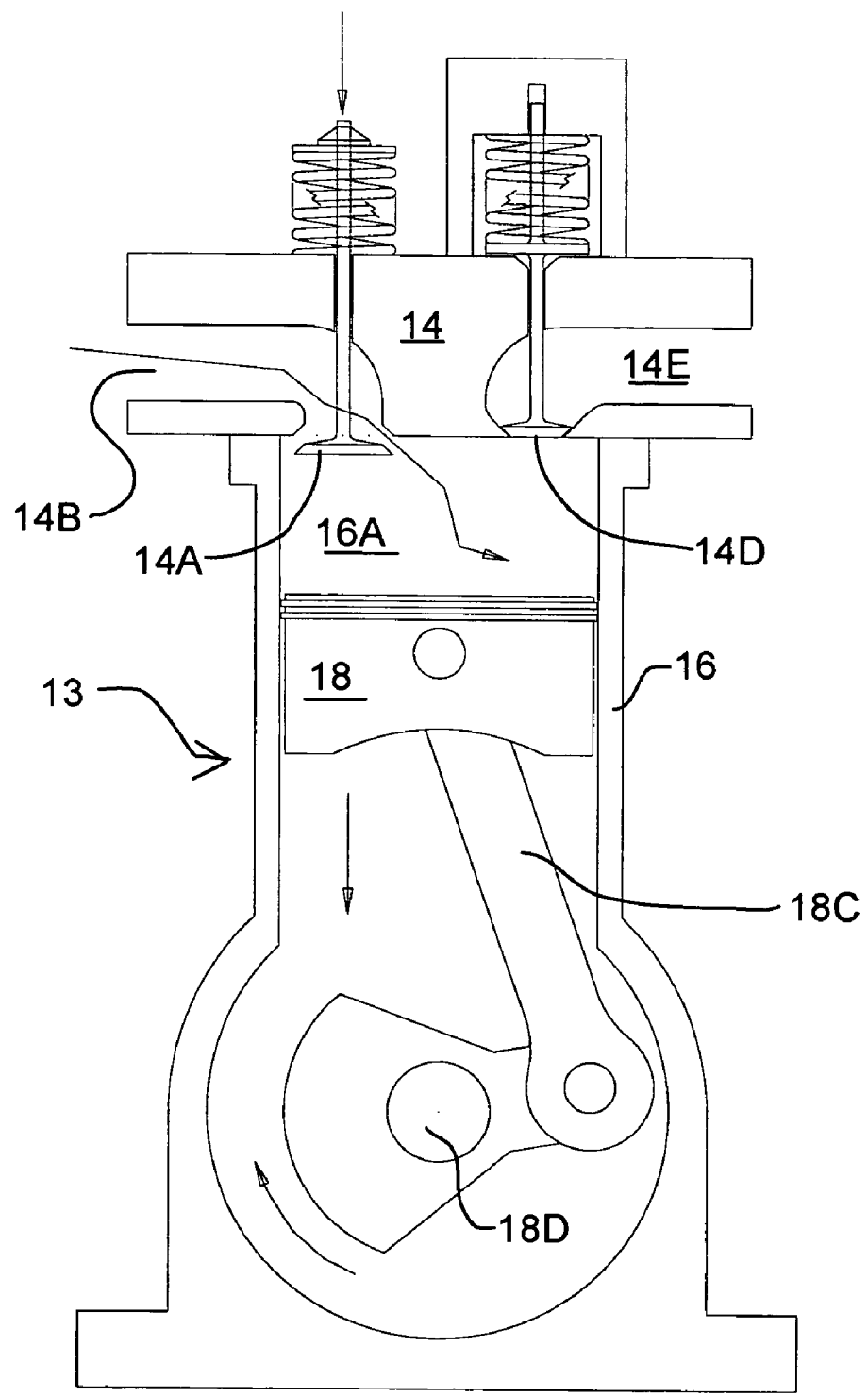
FIG. 2A shows the compression cylinder during its intake stroke.
Figure 2B:
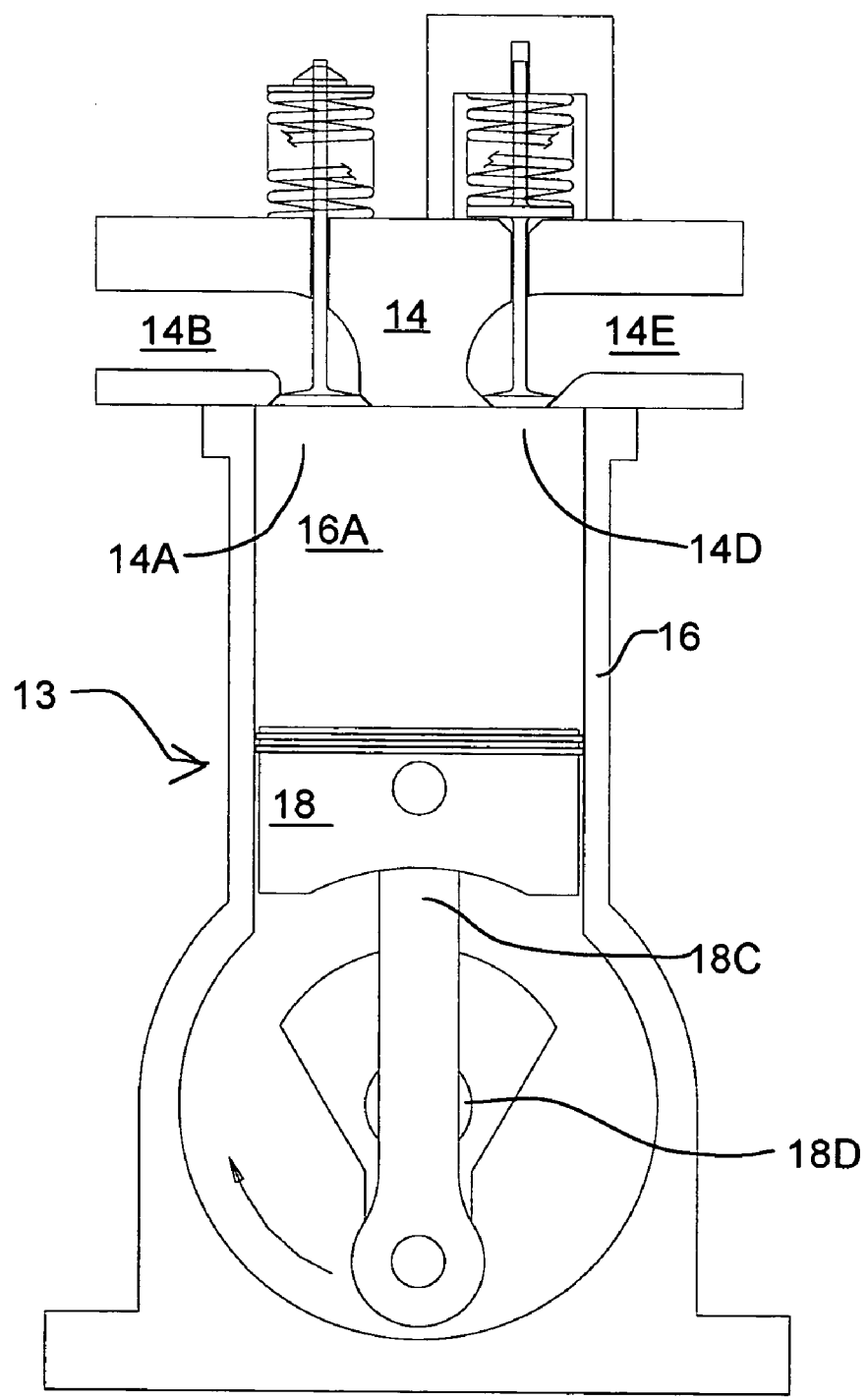
FIG. 2B shows the compression cylinder at bottom dead center.
Figure 2C:
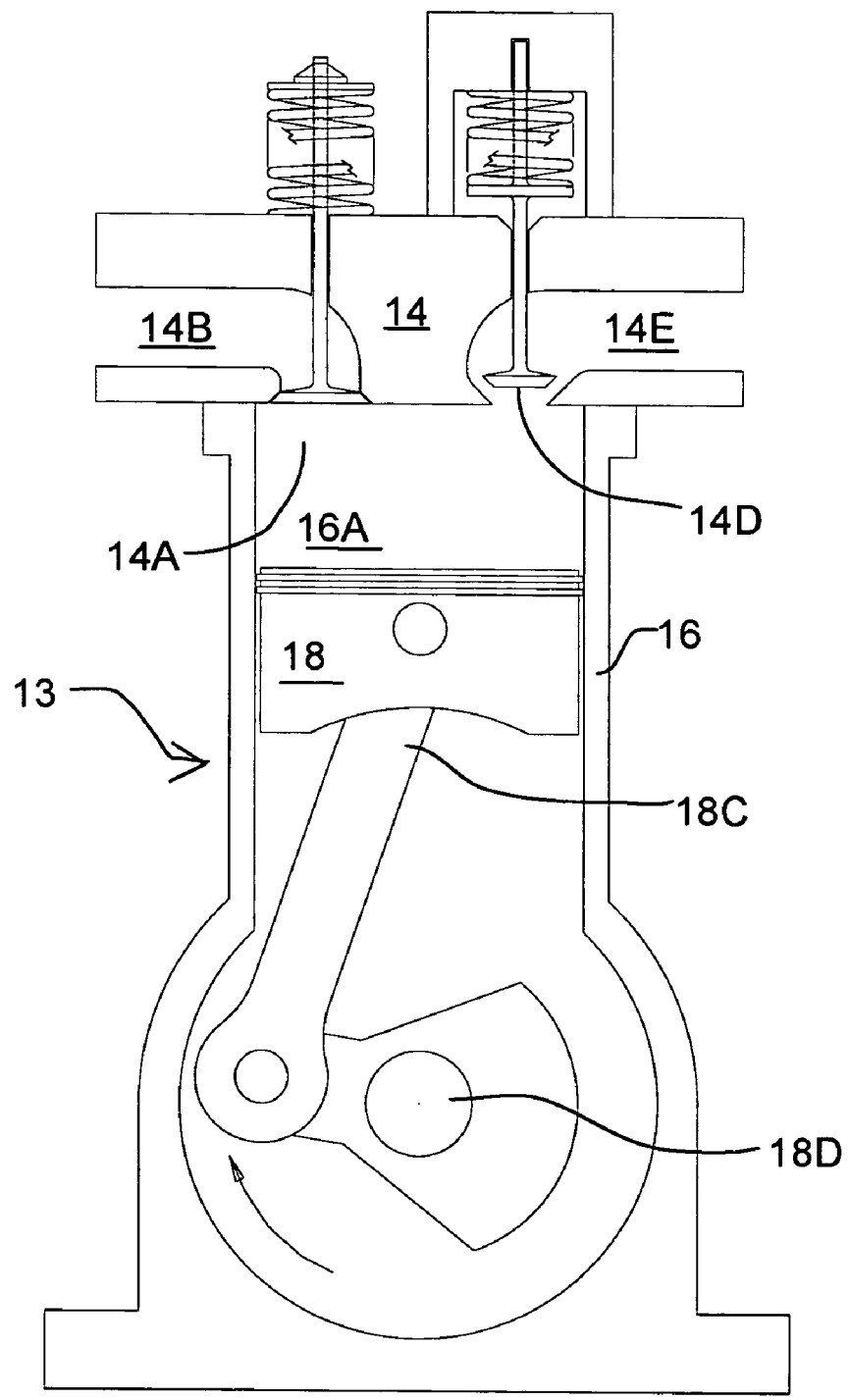
FIG. 2C shows the compression cylinder during its compression stroke.

FIGS. 2A–2C illustrate the operation of compression cylinder 13. FIG. 2A shows compression cylinder 13 during its intake stroke. In FIG. 2A, intake valve 14A is open, outlet valve 14B is closed and compression piston 18 is descending as air is pulled into compression chamber 16A. In FIG. 2B, compression cylinder is at bottom dead center and intake valve 14A and outlet valve 14B are both closed. In FIG. 2C, intake valve 14A is closed and outlet valve 14B is open as the ascending compression piston 18 is forcing compressed air into intake portion 52 of compressed air conduit 50. This positive displacement compressor shown in FIG. 1 and FIGS. 2A–2C is of a type that is well know in the art. However, it could be replaced by any suitable compressor means that is capable of delivering compressed air with a compression ratio above 15 to 1.

Compressed air conduit 50 is intended to receive and store compressed air and then deliver it to combustion cylinder 70 within desired temperature and pressure ranges. Compression cylinder 13 as shown in FIG. 2A is intended to compress air at a ratio substantially in excess of 15 to 1. It should be noted that air at an ambient temperature and pressures (such as 20° C. and one atmosphere of pressure), when compressed at 15 to 1, will increase in temperature to a temperature that may be above the auto-ignition temperature of a desired fuel. Accordingly, compressed air conduit 50 includes a heat rejecting portion 56A having heat rejecting fins 56A for rejecting a portion of the heat present in the compressed air leaving compression cylinder 13. On the other hand, insulated reservoir 54 of compressed air 50 stores compressed air with minimal heat loss. Cool compressed air valve 60 and hot compressed air valve 62 for adjusting the flow through a hot conduit 54A can be adjusted to mix an air stream that is controlled within a pre-selected temperature range that is below the auto-ignition temperature of a desired fuel. The presence of this temperature control feature is merely a preferred feature for use with an engine that is intended for burning fuels subject to auto-ignition. In the alternative, this temperature control feature may be useful even where premature auto-ignition is not an issue.

FIGS. 3A–3H diagram the operation of combustion cylinder 70. FIGS. 4A–4H diagram the operation of combustion cylinder 70 with a rotary valve 82 as shown in FIGS. 3I–3N instead of a stem type injection valve 72A. FIG. 3 provides a corresponding timing diagram which shows the relative timing of the positions shown in FIGS. 3A–3H and FIGS. 4A–4H. The timing diagram of FIG. 3 can be envisioned as being divided into segments which may overlap. These segments further correspond to the various configurations shown in the other figures including FIGS. 3A–3P and FIGS. 4A–4H. Segment A corresponds to FIGS. 3A and 4A to the extent that valve 72B of FIGS. 3A and 4A are open during segment A, yet segment A also corresponds to a relatively large portion of the crankshaft cycle whereas FIGS. 3A and 4A only show piston 76 and connecting rod 76C in one position rather than a range of positions. During this segment, exhaust gasses are expelled from combustion cylinder 70 as piston 76 executes a portion of its return stroke. Segment B1 in FIG. 3 corresponds to the intermittent rotation of valve body 88 of indexed rotary valve 82 and is only applicable to the rotary valve configuration illustrated in FIGS. 3I–3N and FIGS. 4A–4H. Segment B2 is preferably centered in segment B1. Segment B2 corresponds to the portion of the cycle in which one of passages 88A of valve body 88 is in communication with injection port 86D of valve housing 86 thus providing open communication between valve housing 86 (and thus by extension compressed air conduit 50) and combustion chamber 74B. In the rotary valve case, the center of segment B2 corresponds with the alignment of one of passages 88A with injection port 86D as illustrated in FIG. 3J. Yet, for the stem valve case, segment B2 also corresponds to the portion of the cycle when injection valve 72A is open. Note that segment A and segment B2 slightly overlap indicating the scavenging of exhaust gasses from combustion chamber 74B. Such scavenging is illustrated in FIGS. 3B and 4B. If a simple stem valve is used for an injection valve, then segment B1 is omitted and the overlapping portion of segment A and segment B2 would correspond to FIG. 3B. Again, if a stem type injection valve is used, then the portion of segment B2 not overlapping with segment A would correspond to FIG. 3C where pressurized air is being injected into combustion cylinder 70. Segment C corresponds to the injection of fuel shown in FIGS. 3D and 4D. Location D corresponds to the activation of an ignition initiator or spark plug as shown in FIGS. 3E and 4E. As has been noted above location D as well as ignition initiator 72D are optional and may be omitted if a Diesel type engine is desired. Fuel injection of segment C of FIG. 3 may overlap or fall completely within the air injection portion B2 as desired by the engine designer. Those skilled in the art of engine design should appreciate that both air injection portion B2 and fuel injection portion C should be completed prior to the action of ignition initiator 72D or in the case of a Diesel, the air injection should be complete prior to fuel injection which will result in auto-ignition. Since the combustion piston 76 is traveling upward towards the top dead center position during these segments of the cycle, a slight recompression of the injected fuel—air mixture will occur. This recompression effect can be minimized and compensated for by proper design of the engine cycle. Segment E corresponds to the combustion phase shown in FIGS. 3F and 4F. Segment F corresponds to the expansion portion of the cycle depicted in FIGS. 3G and 4G. Optionally, segment G, indicates the exposure of optional exhaust port 74C shown in FIGS. 3A–3H but omitted in FIGS. 4A–4H.

A timing diagram such as the diagram of FIG. 3 is not provided here to illustrate the operation of compression cylinder 13 as shown in FIGS. 2A–2C. This is because the timing of the intake and compression portions for compression cylinder 13 is so simple that it can even be managed with the use of spring loaded valves. However, the various process described above can be related to thermodynamic diagrams FIG. 5 and FIG. 6. Although, the present engine may a compression cycle that is mechanically separated from the combustion cycle, FIG. 5 and FIG. 6 show how these separate mechanical cycles inter-relate in a single thermodynamic cycle.

Figure 5:
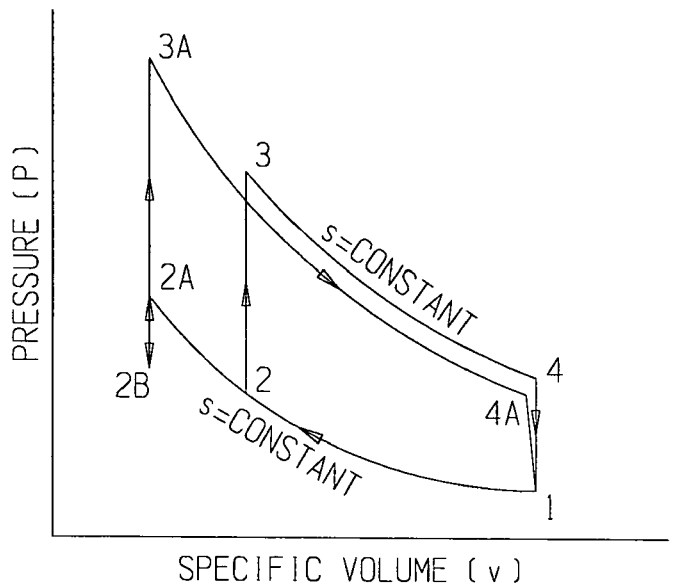
FIG. 5 is a Pressure verses Specific Volume graph for the thermodynamic cycle of the of an embodiment of the invention internal combustion engine having an inter-cooler for cooling pressurized air.
Figure 6:
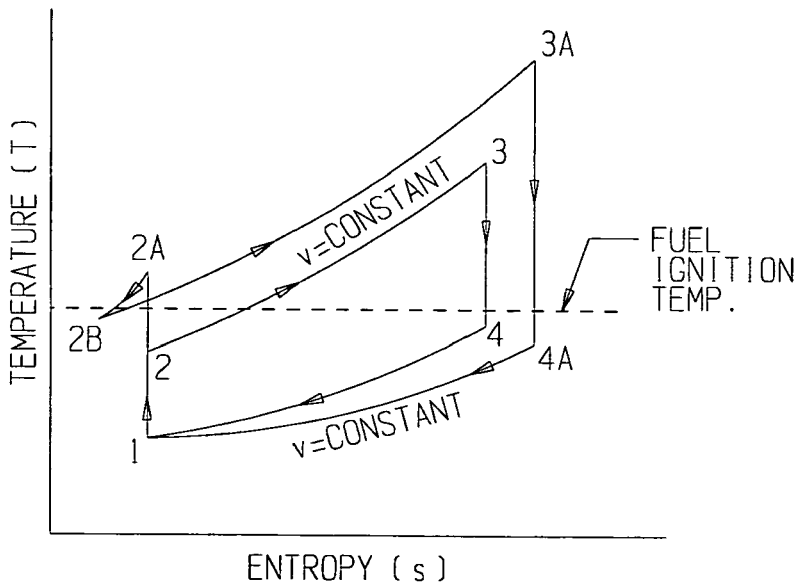
FIG. 6 is a Temperature versus Entropy graph for the thermodynamic cycle of the of an embodiment of the invention internal combustion engine having an inter-cooler for cooling pressurized air.
Figure 7:
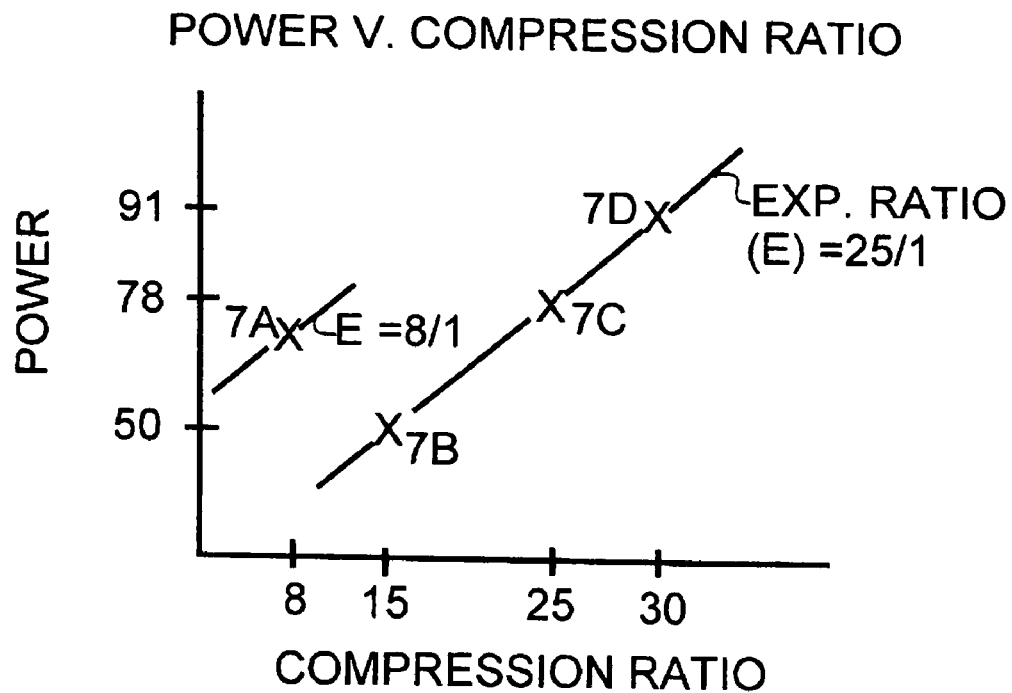
FIG. 7 is an illustrative plot of Power versus Compression Ratio for curves of a set value for Expansion Ratio.
Figure 8:
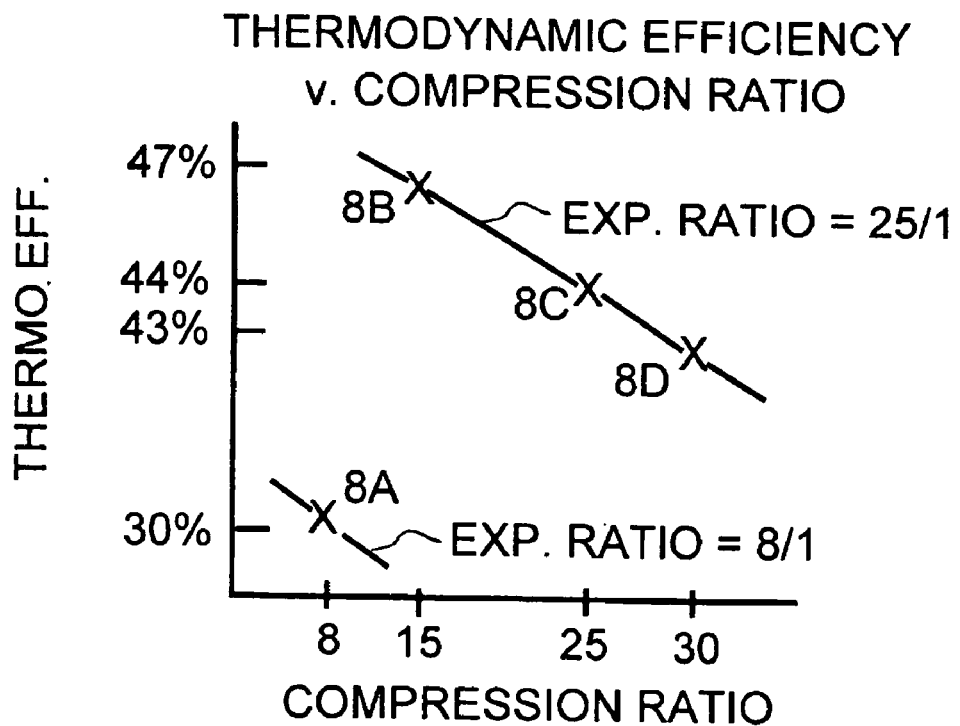
FIG. 8 is an illustrative plot of Thermodynamic Efficiency versus Compression Ratio for curves of a set value for Expansion Ratio.

FIGS. 5 and 6 are thermodynamic plots of the type typically used by those skilled in the art to diagram thermodynamic cycles. These plots present the state of the working fluid, which in this case is air, during the course of each cycle. The paths traced between points 1, 2, 3 and 4 in FIGS. 5 and 6 represent the standard Otto cycle of a typical prior art internal combustion engine. The paths traced between points 1, 2A, 2B, 3A and 4A represent the thermodynamic cycle of the present internal combustion engine 10.

FIG. 5 is thermodynamic plots of pressure verses specific volume, while FIG. 6 gives thermodynamic plots of temperature versus entropy. Specific volume is merely the inverse of density and can be expressed in cubic meters per kilogram. For many, entropy is a more difficult concept to grasp. It could be understood as the degree by which a working fluid (such as air in the present engine) deviates from the prevailing conditions of the surrounding environment. So, for example, in FIG. 6, state point 3A correlates to the end of the combustion process when gasses in combustion chamber 74B are very hot and at a very high pressure—a high entropy condition which differs greatly from ambient conditions. By contrast, state point 1 in FIG. 6 corresponds to ambient air prior to its intake in the compression stroke of compression cylinder 13—a condition that does not differ from the low entropy condition of the surrounding environment.

As noted above, in FIG. 5 and FIG. 6, the thermodynamic cycle for a typical prior art Otto cycle engine is represented by a cycle that follows a path including state points 1, 2, 3 and 4. Compression occurs between state points 1 and 2., combustion occurs between state points 2 and 3, expansion of combustion gasses occurs between state points 3 and 4 and the exhaust of the gaseous combustion products occurs between state points 4 and 1. Generally, in a typical prior art engine, thermodynamic efficiency is understood as the ratio of the useful work captured between state points 3 and 4 and the energy input needed for compression and fuel combustion occurring between state points 1 and 3.

In FIG. 5 and FIG. 6, the thermodynamic cycle for the preferred embodiment of present FIG. 1 engine is represented by the paths that travel through state points 1, 2A, 2B, 3A and 4A. The compression of cylinder 13 occurs between points 1 and 2A. The optional cooling of compressed air from cylinder 12 in compressed air conduit 50 occurs between points 2A and 2B. Without this optional cooling, the process would proceed from point 2A directly to point 3A. Note that in FIG. 6, state point 2B is at a temperature that is below the fuel ignition temperature. This permits spark controlled ignition as opposed to auto-ignition in an engine which uses a fuel adapted for spark ignition. Even though this cooling below the auto-ignition temperature results in a small energy loss, much of the thermodynamic benefit of the additional compression is retained. This additional compression corresponds to the paths between points 2 to 2A in FIGS. 5 and 6.

For example, the state points 1, 2, 3 and 4 described above for a typical Otto cycle engine could be given as follows as shown in the chart below

| Point | Description | Pressure (P) (MPa) | Sp. Vol. (v) (m³/kg) | Temperature T (° K.) |
|---|---|---|---|---|
| 1 | Start of Compression | 0.100 MPa (14.4 psia) | 0.829 m³/kg | 289° K. (60° F.) |
| 2 | End of Compression | 1.825 MPa | 0.104 m³/kg | 663° K. |
| 3 | End of Combustion | 8.739 MPa | 0.104 m³/kg | 3175° K. |
| 4 | End of Exhaust | 0.475 Mpa (69.0 psia) | 0.829 m³/kg | 1382° K. (2028° F.) |

The above chart describes an example process featuring a typical 8:1 compression ratio where the heat added is 1900 KJ/Kg, heat loss is 783 KJ/Kg and the useful work is 1017 KJ/Kg. This yields a thermodynamic efficiency of 56.5%.

In contrast, state points 1, 2, 2A, 2B, 3A and 4A shown in FIGS. 5 and 6, could, for example, be described by the second chart below:

| Point | Description | Pressure (P) (MPa) | Sp. Vol. (v) (m³/kg) | Temperature T (° K) |
|---|---|---|---|---|
| 1 | Start of Compression | 0.100 MPa (14.4 psia) | 0.829 m³/kg | 289° K (60° F.) |
| 2A | End of Compression | 6.597 MPa | 0.041 m³/kg | 957° K |
| 2B | Intercooler Exit | 4.569 Mpa | 0.041 m³/kg | 663° K |
| 3A | End of Combustion | 21.878 MPa | 0.041 m³/kg | 3175° K |
| 4A | End of Exhaust | 0.329 Mpa (48.0 psia) | 0.829 m³/kg | 957° K (1264° F.) |

The above chart describes an example process which traces points 1, 2A, 2B, 3A and 4A shown in FIGS. 5 and 6. This modified process features an enhanced 20:1 compression ratio achievable with the present engine. In this high compression process, the heat added is 1800 KJ/Kg, heat loss is 690 KJ/Kg and the useful work is 1010 KJ/Kg. This yields a theoretical thermodynamic efficiency of 61.7% which is significantly greater than the theoretical 56.5% thermodynamic efficiency of the process given above having a typical 8:1 compression ratio.

Accordingly, presented here is an engine having a means for controlling the pressure and temperature of compressed air in an Otto cycle and a means for controlling the injection of compressed air into a combustion cylinder generally during the second half of a piston return stroke so that higher thermodynamic efficiencies or power densities may be achieved.

It is to be understood that while certain forms of this invention have been illustrated and described, it is not limited thereto, except in so far as such limitations are included in the following claims and allowable equivalents thereof.

What is claimed is:

1. In combination with an internal combustion engine of the type including at least one combustion chamber which oscillates between a minimum volume and a maximum volume during alternating expansion portions and contraction portions of successive cycles for causing powered rotation of a crank shaft, a system for injecting compressed air into said combustion chamber comprising:
   (a) a compressed air source in communication with said combustion chamber, said compressed air source including a compressor and a compressed air conduit communicating between said compressor and said combustion chamber and said compressed air conduit further comprises (i) a reservoir for accumulating and storing said compressed air, (ii) a heat rejecting portion for cooling said compressed air, (iii) an outlet portion for conveying pressurized air to said combustion cylinder, (iv) a hot conduit for conveying uncooled compressed air to said outlet portion and (v) a cool conduit for conveying cooled pressurized air from the heat rejection portion to said outlet portion and at least one valve communicating between one of said hot conduit and said cool conduit for adjusting the proportion of cooled compressed air and uncooled compressed air for adjusting the temperature of the pressurized air in said outlet portion.

2. The combination of claim 1 wherein
said at least one combustion chamber includes a piston mechanically coupled to a crankshaft and said compressed air source includes a compressor powered by a compressor shaft and wherein said crankshaft and said compressor shaft are mechanically coupled such that the speed of rotation of said compressor shaft is adjustable in relation to the speed of rotation of said crankshaft so that effective compression ratio of said engine may be adjusted.

3. An internal combustion engine, comprising;
   (a) at least one combustion cylinder including a cylinder and a reciprocating piston, said reciprocating piston oscillating within said cylinder in cycles which include a power stroke in which said piston moves from a top dead center position to a bottom dead center position and a return stroke in which said piston moves from said bottom dead center position to said top dead center position, said power stroke further divided into a first half portion and a second half portion and said return stroke further divided into a first half portion and a second half portion,
   (b) a compressor for producing compressed air,
   (c) a compressed air conduit communicating between said compressor and said combustion cylinder, said compressed air conduit including a reservoir for accumulating and storing said compressed air, (ii) a heat rejecting portion for cooling said compressed air, (iii) an outlet portion for conveying pressurized air to said combustion cylinder, (iv) a hot conduit for conveying uncooled compressed air to said outlet portion and (v) a cool conduit for conveying cooled pressurized air from said heat rejection portion to said outlet portion and at least one valve communicating between one of said hot conduit and said cool conduit for adjusting the proportion of cooled compressed air and uncooled compressed air for adjusting the temperature of the pressurized air in said outlet portion,
   (d) an injection valve for opening and closing communication between said outlet portion of said compressed air conduit and said at least one combustion cylinder thereby intermittently allowing passage of a volume of compressed air into said combustion cylinder,
   (e) a fuel injector for injecting fuel into said volume of compressed air,
   (f) an exhaust means for releasing exhaust from said combustion cylinder,
   (g) a timing system for:
      (i) opening said injection valve when said piston of said at least one combustion cylinder is generally in said second half portion of said return stroke to transfer said volume of compressed air into said combustion cylinder,
      (ii) activating said fuel injector after said compressed air valve has opened to inject fuel into said volume of compressed air to produce a combustible fuel—air mixture for subsequent combustion and expansion during said power stroke, and,
      (iii) opening said exhaust means after said piston has entered said second portion of said power stroke to allow escape of exhaust gases.

4. The internal combustion engine of claim 3, wherein,
said injection valve is a rotary valve that is operatively associated with said piston of said at least one combustion cylinder by said timing system, said rotary valve including a passage for establishing intermittent communication between said compressed air conduit and said at least one combustion cylinder during a portion of said cylinder cycle within said second half portion of said return stroke.

5. The internal combustion engine of claim 3, wherein,
said at least one combustion cylinder further includes a connecting rod connecting said piston with a crankshaft for rotation in response to said oscillating movement of said piston, and wherein,
said injection valve is an indexed rotary valve, said rotary valve including a valve body and an indexing means operatively coupling said valve body with said crankshaft for causing intermittent rotation of said valve body in response to said continuous rotation of said crankshaft substantially when said piston is in said second half portion of said return stroke, said valve body including a passage for providing communication between said compressed air conduit and said at least one combustion cylinder during a portion of said intermittent rotation of said valve body.

6. The internal combustion engine of claim 3, wherein,
said at least one combustion cylinder further includes a connecting rod connecting said piston with a crankshaft for rotation in response to said oscillating movement of said piston, and wherein,
said injection valve is an indexed rotary valve disposed between said compressed air conduit and said combustion cylinder, said indexed rotary valve further comprising a valve housing for enclosing a valve housing volume in pneumatic communication with said compressed air conduit, said valve housing having an injection port for communicating said valve housing volume with said combustion cylinder, a valve body rotatably disposed within said valve housing in sealed relationship with said injection port and including at least one passage for intermittently establishing pneumatic communication between said valve housing volume and said injection port, and an indexing means operatively associating said valve body and said crankshaft for intermittently rotating said valve body such that said at least one passage of said valve body establishes pneumatic communication between said valve housing volume and said injection port to allow passage of said volume of compressed air into said combustion cylinder.

7. The internal combustion engine of claim 3, wherein,
said at least one combustion cylinder further includes a connecting rod connecting said piston with a crankshaft for rotation in response to said oscillating movement of said piston, and,
said injection valve is an indexed rotary valve disposed between said compressed air conduit and said combustion cylinder, said indexed rotary valve further comprising a valve housing for enclosing a valve housing volume in pneumatic communication with said compressed air conduit, said valve housing having an injection port communicating said valve housing volume with said combustion cylinder, a valve body rotatably disposed within said valve housing in sealed relationship with said injection port and including at least one passage for intermittently opening pneumatic communication between said valve housing volume and said injection port, and an indexing mechanism coupling between said valve body and said crankshaft for intermittently rotating said valve body such that said at least one passage of said valve body opens pneumatic communication between said valve housing and said injection port to convey said injection air into said combustion cylinder, said indexing mechanism including a drive wheel and an indexing wheel, said drive wheel coupled to said crankshaft for continuous rotation therewith, said drive wheel having at least one cog and a retaining disc, said indexing wheel coupled to said valve body and having at least one slot for receiving said at least one cog of said drive wheel for intermittent motion of said indexing wheel in response to continuous rotating motion of said cog of said drive wheel during a first portion of the rotational cycle of said drive wheel, said indexing wheel further comprising at least one retaining feature compatible with said retaining disc of said drive wheel for retaining said indexing wheel in a stationary position during a second portion of the rotational cycle of said drive wheel, said valve body and said indexing wheel coupled such that pneumatic communication between said at least one passage of said valve body and said injection port occurs during said first portion of the rotational cycle of said drive wheel, said drive wheel and said crankshaft also coupled such that said first portion of the rotational cycle of said drive wheel occurs substantially when said piston is in said second half portion of said return stroke.

8. The internal combustion engine of claim 3, wherein, said compressor includes a compression cylinder.

9. The internal combustion engine of claim 3, wherein,
said at least one combustion cylinder includes a crankshaft and a connecting rod coupling the piston and the crankshaft, and
said compressor includes at least one compression cylinder including a piston mechanically coupled to said crankshaft.

10. An internal combustion engine, comprising;
(a) at least one combustion cylinder including a cylinder and a reciprocating piston, said reciprocating piston oscillating within said cylinder in cycles which include a power stroke in which said piston moves from a top dead center position to a bottom dead center position and a return stroke in which said piston moves from said bottom dead center position to said top dead center position, said power stroke further divided into a first half portion and a second half portion and said return stroke further divided into a first half portion and a second half portion, said at least one combustion cylinder further including a crankshaft mechanically coupled to said piston,
(b) a compressor for producing compressed air mechanically coupled to a compressor shaft, said crankshaft of said at least one combustion cylinder and said compressor shaft operatively associated such that the ratio of their speeds of rotation is adjustable for adjustment of the effective compression ratio of said engine,
(c) a compressed air conduit communicating between said compressor and said combustion cylinder,
(d) an injection valve for opening and closing communication between said compressed air conduit and said at least one combustion cylinder thereby intermittently allowing passage of a volume of compressed air into said combustion cylinder,
(e) a fuel injector for injecting fuel into said volume of compressed air,
(f) an exhaust means for releasing exhaust from said combustion cylinder,
(g) a timing system for
(i) opening said injection valve when said piston of said at least one combustion cylinder is generally in said second half portion of said return stroke to transfer said volume of compressed air into said combustion cylinder,
(ii) activating said fuel injector after said compressed air valve has opened to inject fuel into said volume of compressed air to produce a combustible fuel—air mixture for subsequent combustion and expansion during said power stroke, and,
(iii) opening said exhaust means after said piston has entered said second portion of said power stroke to allow escape of exhaust gases.

11. The internal combustion engine of claim 10, wherein,
said crankshaft and said compressor shaft are operatively connected by a variable ratio gear box adapted for operation between a first ratio in which the ratio of speeds of rotation of said compressor shaft to said crankshaft is relatively low and a second ratio in which the ratio of speeds of rotation of said compressor shaft to said crankshaft is relatively high, said first ratio for maintaining air pressure in said compressed air conduit at a relatively low pressure corresponding to a relatively low volumetric compression ratio, said second ratio for maintaining air pressure in said compressed air conduit at a relatively high pressure corresponding to a relatively high compression ratio, said first ratio for relatively high efficiency and relatively low power density operation, said second ratio for relatively lower efficiency and relatively high power density operation.

12. The internal combustion engine of claim 10, wherein, said compressed air conduit further comprises a heat rejecting portion for cooling said at least a portion of said compressed air.

13. The internal combustion engine of claim 10, wherein, said compressed air conduit further comprises (i) a reservoir for accumulating and storing said compressed air and (ii) a heat rejecting portion for cooling said compressed air.

14. The internal combustion engine of claim 10, wherein, said compressed air conduit further comprises (i) a reservoir for accumulating and storing said compressed air, (ii) a heat rejecting portion for cooling said compressed air, (iii) an outlet portion for conveying pressurized air to said combustion cylinder, (iv) a hot conduit for conveying uncooled compressed air to said outlet portion and (v) a cool conduit for conveying cooled pressurized air from the heat rejection portion to said outlet portion and at least one valve communicating between one of said hot conduit and said cool conduit for adjusting the proportion of cooled compressed air and uncooled compressed air for adjusting the temperature of the pressurized air in said outlet portion.

* * * * *